(12) United States Patent
Koh et al.

(10) Patent No.: US 7,778,241 B2
(45) Date of Patent: Aug. 17, 2010

(54) APPARATUS AND METHOD FOR DOWNSTREAM POWER MANAGEMENT IN A CABLE SYSTEM

(75) Inventors: Dongsoo Daniel Koh, Irvine, CA (US); Ramon Alejandro Gomez, San Juan Capistrano, CA (US); Francesco Gatta, Laguna Niguel, CA (US); Harold Raymond Whitehead, Duluth, GA (US); Donald G. McMullin, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 118 days.

(21) Appl. No.: 12/219,924

(22) Filed: Jul. 30, 2008

(65) Prior Publication Data

US 2009/0141839 A1    Jun. 4, 2009

Related U.S. Application Data

(60) Provisional application No. 60/991,615, filed on Nov. 30, 2007.

(51) Int. Cl.
*H04L 12/66* (2006.01)
*H04L 5/16* (2006.01)
*H04N 7/173* (2006.01)

(52) U.S. Cl. .................. 370/352; 370/401; 375/222; 348/E5.002; 725/118

(58) Field of Classification Search .......... 370/254, 370/277, 352, 400, 401, 465–468, 477; 375/220–346, 375/E7.271; 348/E5.002, E7.07, 14.01, 14; 725/111, 118, 149; 709/203–222; 340/531–601; 379/114.01, 114.05
See application file for complete search history.

(56) References Cited

U.S. PATENT DOCUMENTS

2003/0028898 A1* 2/2003 Howald ..................... 725/129
2003/0149991 A1* 8/2003 Reidhead et al. ............ 725/119

OTHER PUBLICATIONS

"Data-Over-Cable Service Interface Specifications DOCSIS 1.1 Operations Support System Interface Specification SP-OSSIv1.1-I07-030730", IEEE Computer Society, IEEE, New York, NY, ISBN 0-7381-3696-4 (SH95132) (Print), ISBN 0-7381-3697-2 (SS95132) (PDF), Jun. 18, 2003, pp. i-ix and 1-121 (133 pages total).

* cited by examiner

*Primary Examiner*—Afsar M. Qureshi
(74) *Attorney, Agent, or Firm*—Sterne, Kessler, Goldstein & Fox P.L.L.C.

(57) ABSTRACT

An apparatus and method is disclosed to calculate the actual received desired channel power from the downstream transmit power of a Cable Modem Termination System (CMTS) when operating at the nominal line voltage and/or at the normal room temperature as per the DOCSIS specification. A Set-top Device produces a Downstream Power Management (DPM) gain measurement signal having a known power level. The Set-top Device embeds the DPM gain measurement signal onto a received downstream multi-channel communication signal. After embedding the DPM gain measurement signal onto the downstream multi-channel communication signal, the Set-top Device downconverts the combined DPM gain measurement signal and downstream multi-channel communication signal to recover one or more communication channels containing information of a broadcast. The Set-top Device measures a power level of a representation of the DPM gain measurement signal embedded within the one or more communication channels containing the information of the broadcast to determine a Set-top Device gain. The Set-top Device measures a power level of the one or more communication channels containing the information of the broadcast. The Set-top Device calculates the actual received desired channel power from the downstream transmit power of the CMTS based on the Set-top Device gain and the power level of the one or more communication channels containing the information of the broadcast.

31 Claims, 13 Drawing Sheets

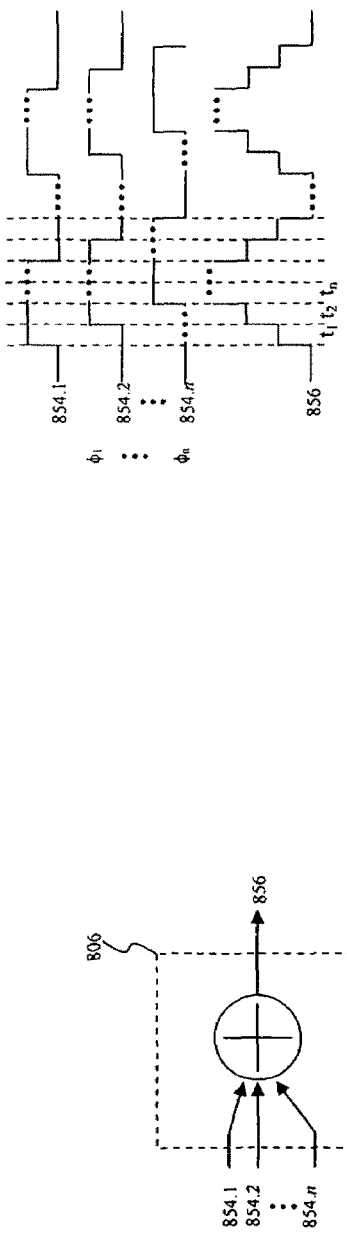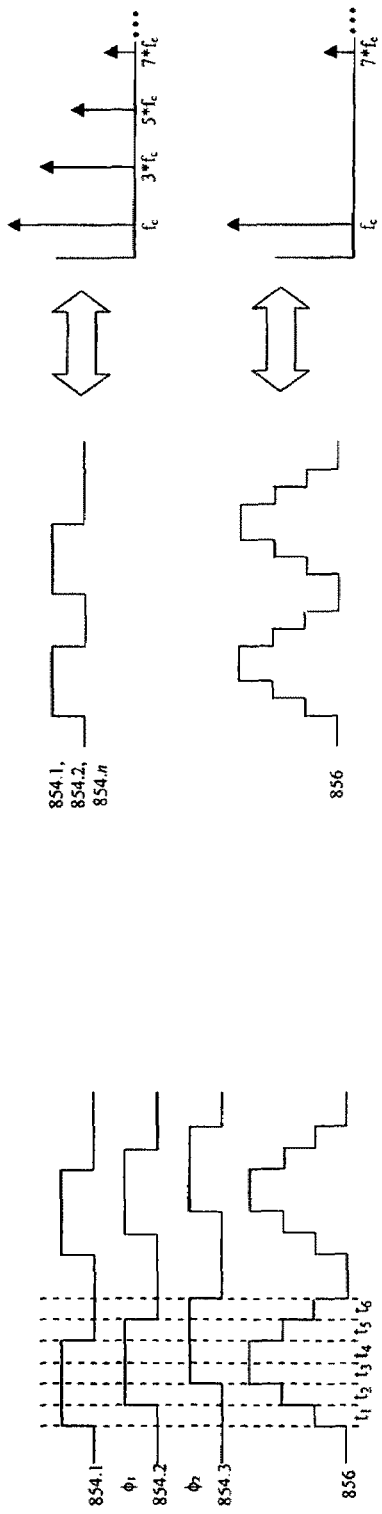
FIG. 9B
FIG. 9D
FIG. 9A
FIG. 9C

APPARATUS AND METHOD FOR DOWNSTREAM POWER MANAGEMENT IN A CABLE SYSTEM

CROSS-REFERENCE TO RELATED APPLICATIONS

The present application claims the benefit of U.S. Provisional Patent Appl. No. 60/991,615, filed Nov. 30, 2007, entitled "Apparatus and Method for Downstream Power Management in a Cable System," which is incorporated herein by reference in its entirety.

FIELD OF THE INVENTION

The present invention generally relates to a set-top box for cable television and more specifically to measurement of a downstream transmit power of a Cable Modem Termination System (CMTS).

BACKGROUND OF THE INVENTION

Cable television (CATV) is a system of providing television, internet data, and/or other services to consumers via radio frequency signals transmitted to one or more customer premises through, but not limited to, optical fibers or coaxial cables as opposed to the over-the-air method used in traditional television broadcasting via radio waves.

A Data Over Cable Service Interface Specification (DOCSIS) communications system includes two primary components: a Set-top Device, such as a cable modem or home gateway to provide some examples, located at the customer premises, and a Cable Modem Termination System (CMTS) located at a headend. DOCSIS is a standard for cable modem interfaces that defines communications and operation support interface requirements for a transfer of data over cable systems. The DOCSIS specification permits the addition of high-speed data transfer to an existing cable TV (CATV) system. For example, many cable television networks employ the DOCSIS specification to provide Internet access over networks such as Hybrid Fiber Coaxial (HFC) networks.

The one or more customer premises, such as customer televisions to provide an example, and associated peripherals are termed Customer Premise Equipment (CPE). The CPE is connected to the Set-top Device, which is in turn connected through the network to the CMTS. The CMTS routes traffic between the network and the Internet. Using the CMTS, a cable operator can control a configuration of the Set-top Device. The configuration of the Set-top Device may be changed to adjust for varying line conditions and/or customer service requirements.

According to the DOCSIS specification, the Set-top Device must report the actual received desired channel power at the Set-top Device from the downstream transmit power of the CMTS within 3 decibels (dB) when operating at a nominal line voltage and/or at a normal room temperature. The DOCSIS specification also provides that across an input power range from −15 dBmV to +15 dBmV, where dBmV represents a voltage relative to one millivolt, the Set-top Device must report a power change in the same direction that is not less than 0.5 dB and not more than 1.5 dB for any 1 dB change in the actual received channel power.

Conventional methods to report the desired channel input power at the Set-top Device from the downstream transmit power of the CMTS require the use of extensive look-up tables stored in a memory storage device, such as a Random Access Memory (RAM), a Dynamic RAM (DRAM), a Synchronous DRAM (SDRAM), a Double Data Rate SDRAM (DDR SDRAM), a hard disk drive, and/or a flash drive such as a Universal Serial Bus (USB) flash drive to provide some examples. These look-up tables may require vast spaces of memory for storage and need to be reconfigured as the components of the Set-top Device change or deteriorate over time. In addition, the look-up tables may need to be modified in a calibration operation during manufacturing, thereby adding to cost.

Similar power reporting requirements, such as those described above, are currently being considered for other broadcast systems, such as satellite television to provide an example.

Thus, what is needed is a system and a method to report the desired channel input power from the downstream transmit power of the broadcast system to overcome the shortcomings stated above.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

FIG. 9A illustrates a harmonic rejection module according to an embodiment of the present invention.

FIG. 9B illustrates an operation of the harmonic rejection module according to an embodiment of the present invention.

FIG. 9C illustrates another operation of the harmonic rejection module according to an embodiment of the present invention.

FIG. 9D illustrates a further operation of the harmonic rejection module according to an embodiment of the present invention.

Figure 1:
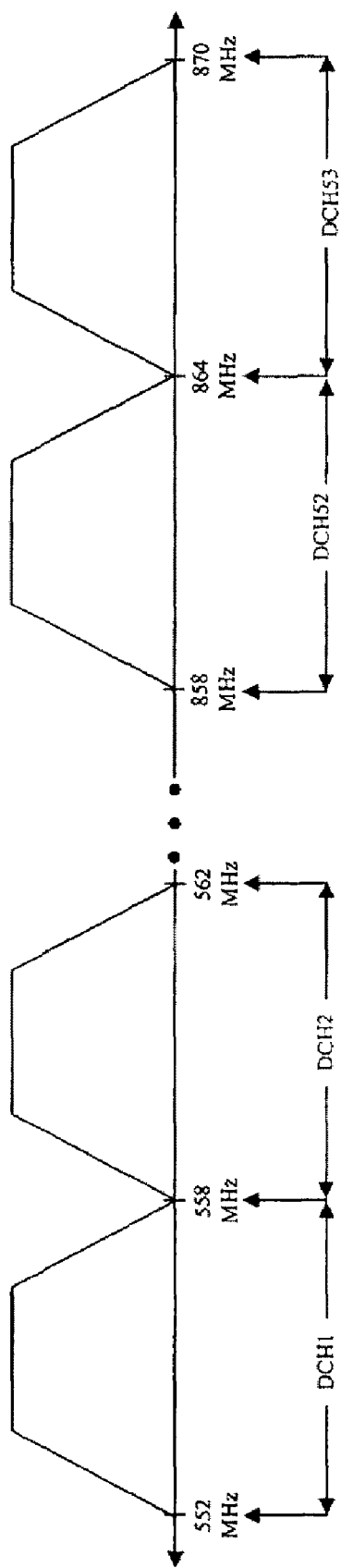
FIG. 1 illustrates an exemplary digital cable television (DCATV) broadcast band for North America.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein may be spatially arranged in any orientation or manner. Likewise, particular bit values of "0" or "1" (and representative voltage values) are used in illustrative examples provided herein to represent information for purposes of illustration only. Information described herein may be represented by either bit value (and by alternative voltage values), and embodiments described herein may be configured to operate on either bit value (and any representative voltage value), as would be understood by persons skilled in the relevant art(s).

The example embodiments described herein are provided for illustrative purposes, and are not limiting. Further structural and operational embodiments, including modifications/alterations, will become apparent to persons skilled in the relevant art(s) from the teachings herein.

1. Overview

A cable system may utilize Data Over Cable Service Interface Specification (DOCSIS) compliant equipment and protocols to carry out a transfer of information, such as video, audio, and/or data between one or more Set-top Devices and one or more cable modem termination systems (CMTS). The DOCSIS Specification generally refers to a group of specifications published by CableLabs® that define industry standards for the CMTS and the Set-top Device. In part, the DOCSIS specification sets forth requirements and objectives for various aspects of cable modem systems including operations support systems, management, data interfaces, as well as network layer, data link layer, and physical layer transport for data over cable systems. The DOCSIS interface specification entitled "Data-Over-Cable Service Interface Specifications, DOCSIS 1.1, Operations Support System Interface Specification, SP-OSSIv1.1-I07-030730" is incorporated by reference herein in its entirety.

A DOCSIS cable system includes two primary components: one or more Set-top Devices at a customer premises, and one or more CMTS located at a headend. As used herein, the term "downstream" refers to the transfer of information in a direction from the headend to the Set-top Device. The term "upstream" refers to the transfer of information in a direction from the Set-top Device to the headend.

2. Exemplary Digital Cable Television (DCATV) Broadcast Bands

FIG. 1 illustrates an exemplary digital cable television (DCATV) broadcast band for North America. However, this example is not limiting, those skilled in the relevant art(s) will recognize that any other suitable broadcast band may be implemented differently in accordance with the teachings herein without departing from the spirit and scope of the present invention. Digital broadcasting of Cable Television (CATV), known as Digital Cable Television (DCATV), broadcasts and receives video, audio, and/or data by means of digital signals. DCATV uses digital modulation data, that is digitally compressed, and requires decoding by, but is not limited to, a specially designed television set, a standard receiver with a Set-top Device, or a PC fitted with a television card to provide some examples.

As shown in FIG. 1, the DCATV broadcast band for North America includes DCATV channels DCH1 through DCH53. An individual DCATV channel, such as DCH1, requires a predetermined range of frequencies, or a bandwidth, to sufficiently transmit the information of the broadcast. For example, each DCATV channel in North America may use up to 6 MHz of the allocated spectrum to transmit the information of the broadcast. The DCATV channel may include one or more broadcast quadrature amplitude modulated (QAM) digital channels, one or more data channels, one or more narrowcast or targeted service channels, and/or any combination thereof. For example, in North America, the DCATV channel may use a 256-QAM modulation with a 5.631 MHz bandwidth and/or a 64-QAM modulation with a 5.057 MHz bandwidth. Each DCATV channel may support about 10 broadcasts referred to as subprograms. The subprograms may include one or more digital television broadcasts and/or one or more data channels for Internet service or other applications.

According to the DOCSIS specification, a Set-top Device must report a downstream transmit power of the CMTS within 3 decibels (dB) of an actual received channel power when operating at a nominal line voltage and/or at a normal room temperature. The DOCSIS specification also provides that across an input power range from −15 dBmV to +15 dBmV, where dBmV represents a voltage relative to one millivolt, the Set-top Device must report a power change in the same direction that is not less than 0.5 dB and not more than 1.5 dB for any 1 dB change in the actual received channel power.

3. Exemplary Set-Top Devices

Figure 2:
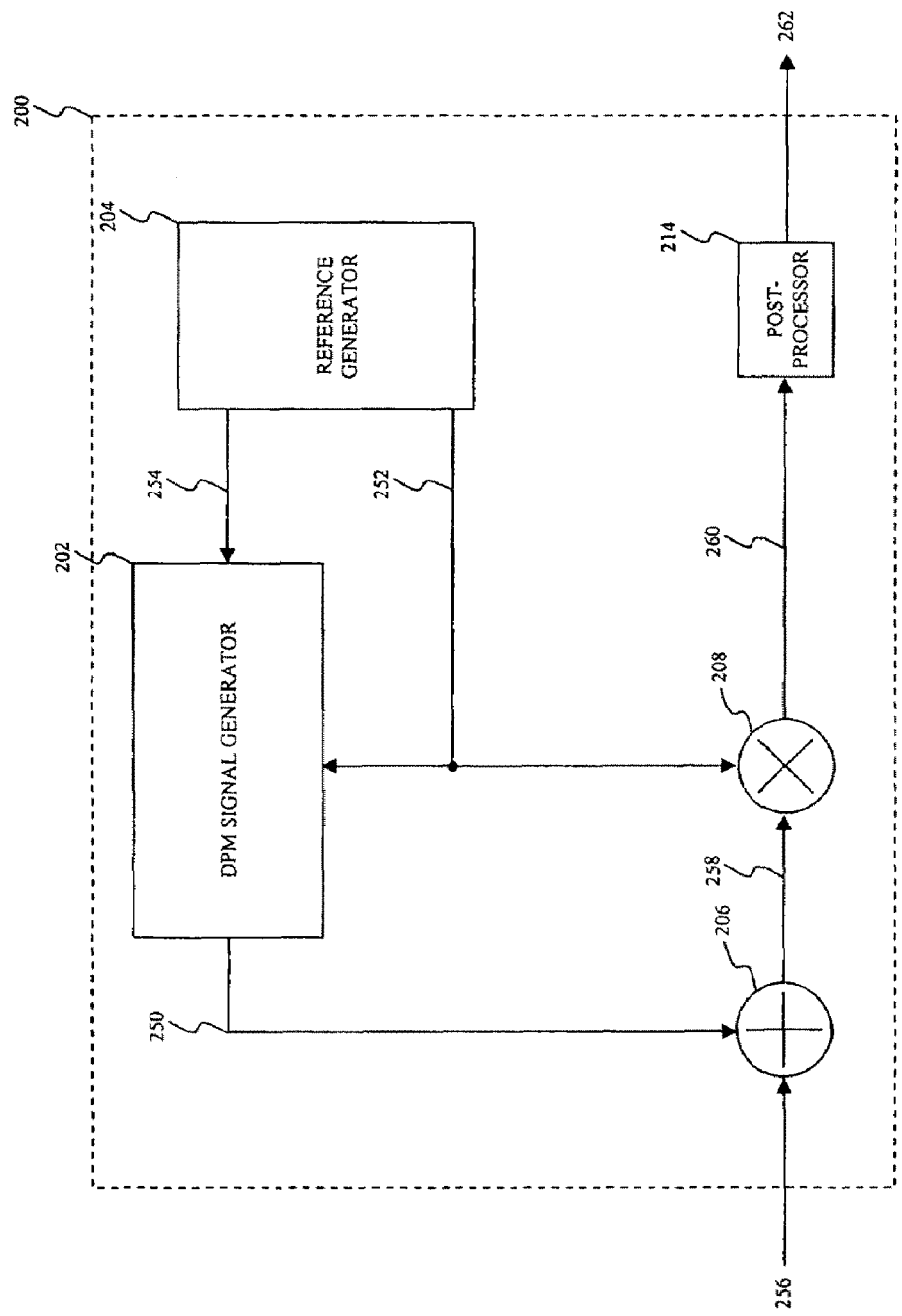
FIG. 2 illustrates a block diagram of a Set-top Device according to an exemplary embodiment of the present invention.

FIG. 2 illustrates a block diagram of a Set-top Device according to an exemplary embodiment of the present invention. A Set-top Device 200 calculates the actual received desired channel input power at the Set-top Device from the downstream transmit power of the CMTS within at least 3 dB when operating at a nominal line voltage and/or at a normal room temperature as per the DOCSIS specification.

A CMTS produces a transmitted downstream multi-channel communication signal having a known power level. The transmitted downstream communication signal passes through a communication channel to produce a received downstream multi-channel communication signal 256. The communication channel may include, but is not limited to, a microwave radio link, a satellite channel, a fiber optic cable, a copper cable, and/or a coaxial cable to provide some examples. A propagation medium of the communication channel introduces interference, distortion, and/or unknown signal loss into the transmitted downstream multi-channel communication signal to produce the received downstream multi-channel communication signal 256. Noise, signal strength variations known as fading, phase shift variations, multiple path delays known as multi-path propagation or echoes, to provide some examples, may introduce the interference, distortion, and/or unknown signal loss into the transmitted downstream multi-channel communication signal. For example, transmission over a multiplicity of paths of different and variable lengths, or rapidly varying delays in the propagation medium may cause a change in the amplitude and/or phase of transmitted downstream multi-channel communication signal. Alternatively, in a coaxial cable network, the transmitted downstream multi-channel communication signal will be attenuated by an amount proportional to a length of the coaxial cable, referred to as cable loss, as a result of an imperfect nature of conductors and/or dielectrics included in the coaxial cable. Additionally, one or more repeater amplifiers used to amplify the transmitted downstream multi-channel communication signal as it traverses through the communication channel may have variability in their gain. The cable loss and variable repeater amplifier gain are generally unknown and may vary as a result of a temperature change to provide an example. As a result, a power level of the received downstream multi-channel communication signal 256 is unknown.

As shown in FIG. 2, a Set-top Device 200 receives a received downstream multi-channel communication signal 256. The Set-top Device 200 receives the downstream multi-channel communication signal as it traverses through the communication channel. The received downstream multi-channel communication signal 256 may include, but is not limited to, one or more one or more digital cable television (DCATV) channels including one or more broadcast quadrature amplitude modulated (QAM) digital channels, one or more data channels, one or more narrowcast or targeted service channels, and/or any combination thereof. For example, the received downstream multi-channel communication signal 256 may include DCATV channel 1 through DCATV channel 53 as shown in FIG. 1. However, this example is not limiting, those skilled in the relevant art(s) will recognize that the received downstream multi-channel communication signal 256 may include any downstream communication signal having any suitable number of information-bearing channels without departing from the spirit and scope of the present invention. For example, the received downstream multi-channel communication signal 256 may include the one or more one or more digital cable television (DCATV) channels and one or more other broadcast signals, such as one or more National Television Standards Committee (NTSC) CATV channels and/or one or more Advanced Television Systems Committee (ATSC) digital cable television (DCATV) broadcast signals.

The Set-top Device 200 produces a Downstream Power Management (DPM) gain measurement signal 250 having a known power level. More specifically, a DPM Signal Generator 202 produces the DPM gain measurement signal 250 based on a first reference frequency 252 and a second reference frequency 254. A reference module 204 includes one or more oscillators to produce the first reference frequency 252 and the second reference frequency 254. In an exemplary embodiment, the DPM gain measurement signal 250 is a substantially sinusoidal signal having a known power level. However, this example is not limiting, those skilled in the relevant art(s) will recognize that the DPM Signal Generator 202 may produce any suitable DPM gain measurement signal 250 having a known power level without departing from the spirit and scope of the present invention. For example, the DPM gain measurement signal 250 may be implemented using a pulse having a known power level. The DPM Signal Generator 202 and the DPM gain measurement signal 250 are described in further detail below in FIG. 5 through FIG. 12.

The Set-top Device 200 embeds the DPM gain measurement signal 250 onto the received downstream multi-channel communication signal 256 using a summation network 206 to produce a gain measurement signal embedded communication signal 258. More specifically, the summation network 206 combines the DPM gain measurement signal 250 with the received downstream multi-channel communication signal 256 to produce the gain measurement signal embedded communication signal 258. As a result, the gain measurement signal embedded communication signal 258 includes the received downstream multi-channel communication signal 256 having the unknown power level and the DPM gain measurement signal 250 having the known power level.

After embedding the DPM gain measurement signal onto the downstream multi-channel communication signal, the Set-top Device 200 downconverts the gain measurement signal embedded communication signal 258 to produce a desired communication channel 260 using a mixer 208. More specifically, the mixer 208 downconverts the gain measurement signal embedded communication signal 258 including the received downstream multi-channel communication signal 256 and the DPM gain measurement signal 250 to an intermediate frequency (IF) or a baseband frequency to produce the desired communication channel 260 based on the first reference frequency 252. As a result, the desired communication channel 260 includes a first component representing a downconverted representation of the received downstream multi-channel communication signal 256 having the unknown power level and a second component representing a downconverted representation of the DPM gain measurement signal 250 having the known power level.

The Set-top Device 200 calculates a desired input power for a communication channel in the received downstream multi-channel communication signal 256 based on a gain of the Set-top Device 200 and a power level of the desired communication channel 260. More specifically, a post-processor module 214 measures a power level of the second component of the desired communication channel 260 to determine the gain of the Set-top Device 200. The gain of the Set-top Device 200 may be represented as:

$$G = d' - A, \quad (1)$$

where G represents the Set-top Device gain in dB, d' represents the power level of the second component of the desired communication channel 260, and A represents the known power level of the DPM gain measurement signal 250.

The Set-top Device 200 determines the desired channel input power for the received downstream multi-channel communication signal 256. More specifically, the post-processor module 214 measures a power level of the first component of the desired communication channel 260. The post-processor module 214 calculates the desired channel input power of the received downstream multi-channel communication signal 256 based on the gain of the Set-top Device 200 and the power level of the first component of the desired communication channel 260. More specifically, the input power of the received downstream multi-channel communication signal 256 may be represented as:

$$x = c' - G, \quad (2)$$

where x represents the input power for the communication channel in the received downstream multi-channel communication signal 256, c' represents the power level of the first component of the desired communication channel 260, and G represents the gain of the Set-top Device 200 from (1).

The post-processor module 214 produces recovered broadcast information 262 based on the desired communication channel 260. The recovered broadcast 262 includes recovered information, such as audio, video, graphics, and/or data to provide some examples, from the desired communication channel 260. For example, the recovered broadcast information 262 may include a recovered representation of the video signal, audio signal, and/or graphics information of the broadcast for a desired DCATV channel, such as DCH1 to provide an example. Alternatively, the recovered broadcast information 262 may include a recovered representation of QAM modulated data for a desired DCATV channel, such as DCH1 to provide an example.

Although the DPM gain measurement signal 250 has been described in reference to calculating the input power for the communication channel in the received downstream multi-channel communication signal 256, those skilled in the relevant art(s) will recognize that the DPM gain measurement signal 250 may also be used to calculate or tune a signal path frequency response of the Set-top Device 200 without departing from the spirit and scope of the present invention. From the discussion above, the post-processor module 214 measures the power level of the second component of the desired communication channel 260. The post-processor module 214 may measure the power level of the second component of the desired communication channel 260 for a range of corresponding frequencies of the DPM gain measurement signal 250. The Set-top Device 200 may adjust the DPM gain measurement signal 250 among the range of corresponding frequencies to calculate or tune the signal path frequency response based upon the power level of the second component of the desired communication channel 260. In an exemplary embodiment, an ability of the Set-top Device 200 to receive the received downstream multi-channel communication signal 256 is disabled. In other words, the Set-top Device 200 does not receive the received downstream multi-channel communication signal 256.

Figure 3:
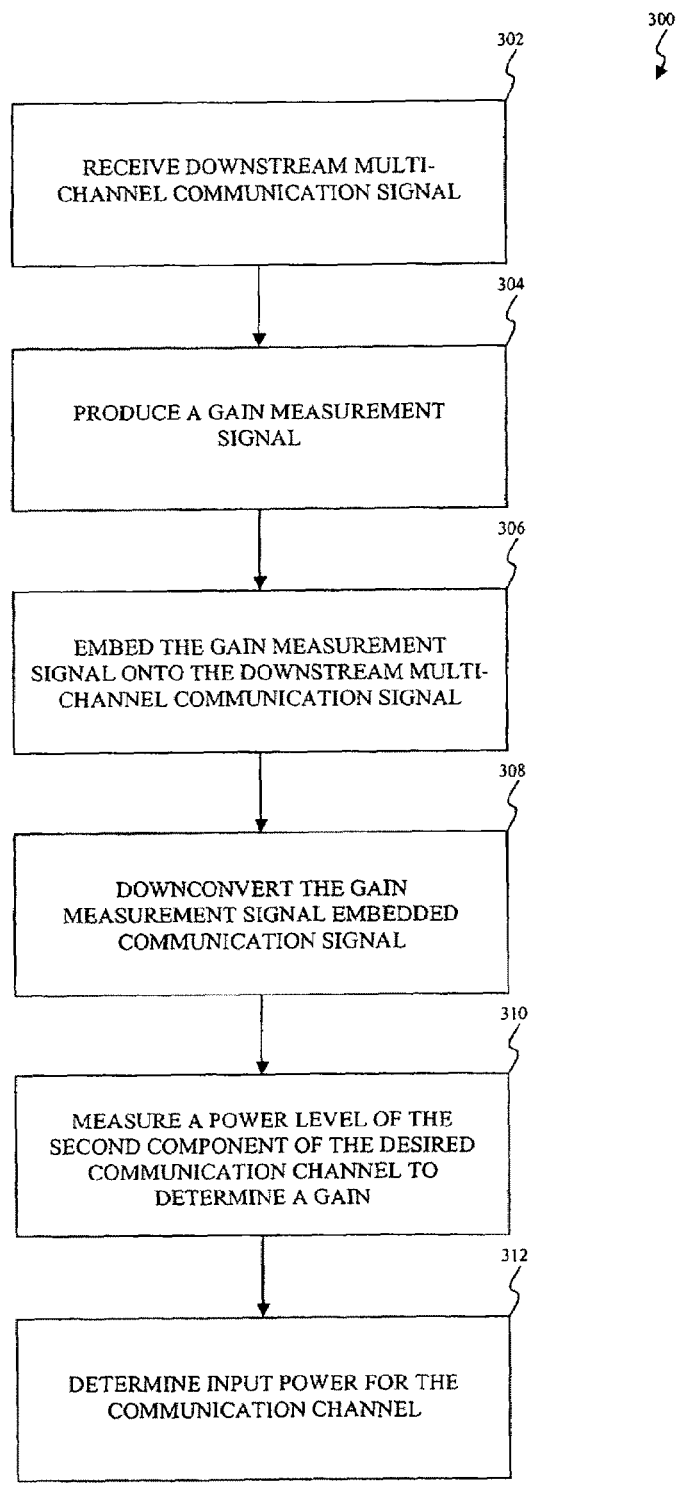
FIG. 3 is a flowchart of exemplary operational steps of a Downstream Power Management (DPM) system according to an exemplary embodiment of the present invention.

FIG. 3 is a flowchart 300 of exemplary operational steps of the DPM system according to an exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 3.

At step 302, a downstream multi-channel communication signal is received by a Set-top Device, such as the Set-top Device 200. The Set-top Device receives the downstream multi-channel communication signal as it traverses through a communication channel. A received downstream multi-channel communication signal may include, but is not limited to, one or more one or more digital cable television (DCATV) channels including one or more broadcast quadrature amplitude modulated (QAM) digital channels, one or more data channels, one or more narrowcast or targeted service channels, and/or any combination thereof For example, the received downstream multi-channel communication signal 256 may include DCATV channel 1 through DCATV channel 53 as shown in FIG. 1. However, this example is not limiting, those skilled in the relevant art(s) will recognize that the received downstream multi-channel communication signal may include any downstream communication signal having any suitable number of information-bearing channels without departing from the spirit and scope of the present invention. For example, the received downstream multi-channel communication signal may include the one or more one or more digital cable television (DCATV) channels and one or more other broadcast signals, such as one or more National Television Standards Committee (NTSC) CATV channels.

At step 304, a gain measurement signal, such as the DPM gain measurement signal 250 is produced. More specifically, a DPM Signal Generator, such as the DPM Signal Generator 202, produces the gain measurement signal. In an exemplary embodiment, the gain measurement signal is a substantially sinusoidal signal having a known power level. However, this example is not limiting, those skilled in the relevant art(s) will recognize that step 304 may produce any suitable gain measurement signal having a known power level without departing from the spirit and scope of the present invention. For example, the gain measurement signal may be implemented using a pulse having a known power level.

At step 306, the gain measurement signal from step 304 is embedded onto the received downstream multi-channel communication signal from step 302. A summation network, such as the summation network 206 to provide an example, may embed the gain measurement signal onto the received downstream multi-channel communication signal to produce a gain measurement signal embedded communication signal. More specifically, step 306 combines the gain measurement signal with the received downstream multi-channel communication signal to produce the gain measurement signal embedded communication signal. As a result, the gain measurement signal embedded communication signal includes the received downstream multi-channel communication signal having the unknown power level and the gain measurement signal having the known power level.

At step 308, the gain measurement signal embedded communication signal from step 306 is downconverted to produce a desired communication channel. A mixer, such as the mixer 208, may downconvert the gain measurement signal embedded communication signal from step 306 to produce the desired communication channel. More specifically, step 308 downconverts the gain measurement signal embedded communication signal including the received downstream multi-channel communication signal from step 302 having the unknown power level and the gain measurement signal from step 304 having the known power level to an intermediate frequency (IF) or a baseband frequency to produce the desired communication channel. As a result, the desired communication channel includes a first component representing a downconverted representation of the received downstream multi-channel communication signal from step 302 having the unknown power level and a second component representing a downconverted representation of the gain measurement signal having the known power level from step 304.

At step 310, a power level of the second component of the desired communication channel from step 308 is measured to determine a gain of the Set-top Device. A post-processor module, such as the post-processor module 214, may measure the power level of the second component to determine the gain of the Set-top Device. The gain of the Set-top Device may be represented as:

$$G = d' - A, \quad (3)$$

where G represents the Set-top Device gain in dB, d' represents the power level of the second component of the desired communication channel from step 308, and A represents the known power level of the gain measurement signal.

At step 312, the input power of the received downstream multi-channel communication signal from step 304 is determined. The post-processor module may determine the input power of the received downstream multi-channel communication signal from step 302. More specifically, step 312 measures a power level of the first component of the desired communication channel step 308. Step 312 calculates the input power for the communication channel in the received downstream multi-channel communication signal from step 302 based on the gain of the Set-top Device and the power level of the first component of the desired communication channel from step 308. More specifically, the input power of the received downstream multi-channel communication signal from step 302 may be represented as:

$$x = c' - G, \quad (4)$$

where x represents the input power for the communication channel in the received downstream multi-channel communication signal from step 302, c' represents the power level of the first component of the desired communication channel 260 from step 302, and G represents the gain of the Set-top Device 200 from (3).

Figure 4:
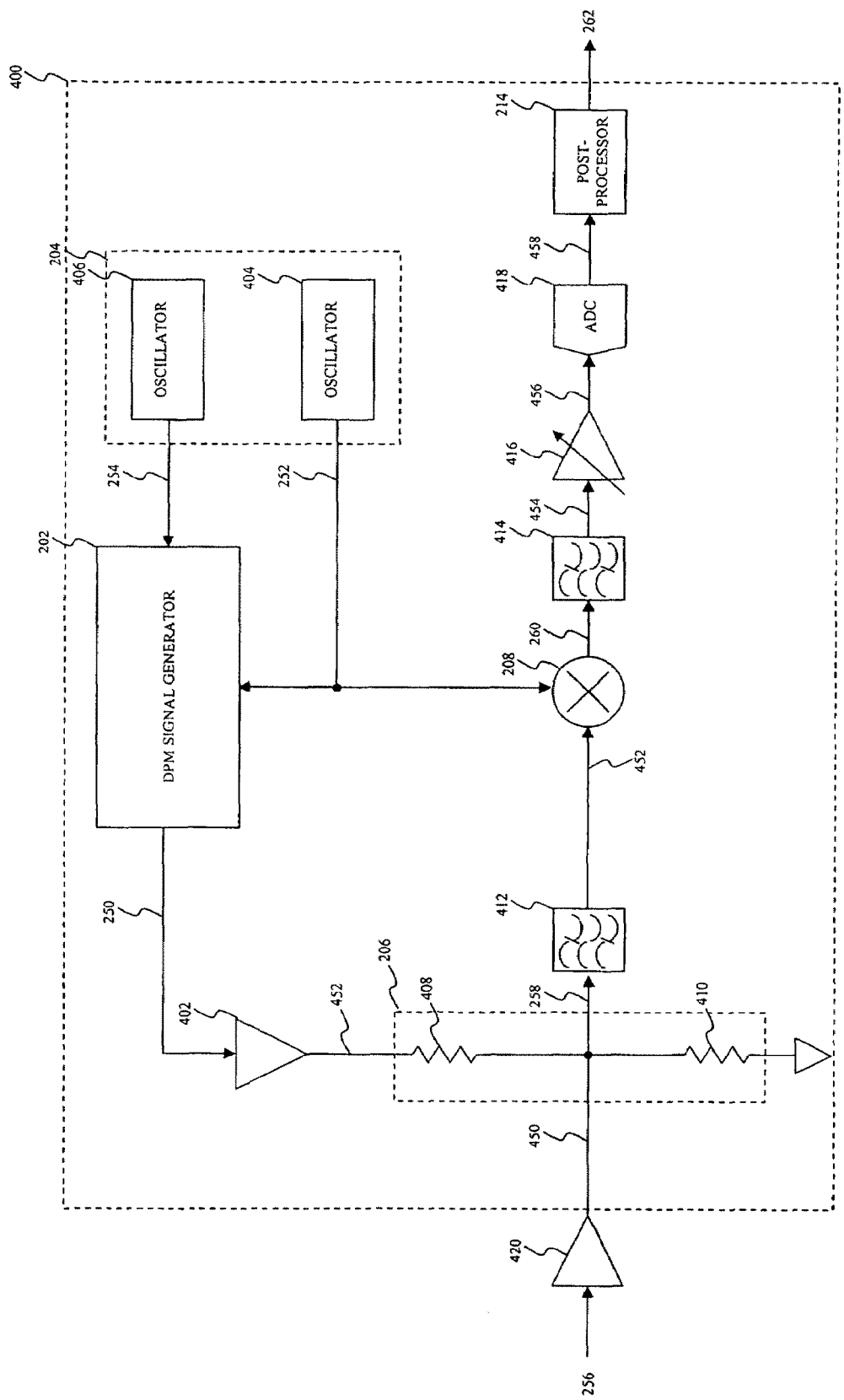
FIG. 4 illustrates a block diagram of the Set-top Device according to another exemplary embodiment of the present invention.

FIG. 4 illustrates a block diagram of the Set-top Device according to another exemplary embodiment of the present invention. A Set-top Device 400 calculates the desired channel input power at the Set-top Device from the downstream transmit power of the CMTS within at least 3 dB of the actual received channel power when operating at a nominal line voltage and/or at a normal room temperature as per the DOCSIS specification.

As shown in FIG. 4, a Set-top Device 400 receives the received downstream multi-channel communication signal 256. An external amplifier 420 may amplify the downstream multi-channel communication signal 256 to produce an amplified downstream multi-channel communication signal 450. The external amplifier 420 may be located external to or outside of the Set-top Device 400. The external amplifier 420 is optional; the Set-top Device 400 may directly receive the downstream multi-channel communication signal 256 without amplification.

The Set-top Device 400 produces the DPM gain measurement signal 250 having the known power level with the DPM Signal Generator 202. From the discussion above, the DPM Signal Generator 202 produces the DPM gain measurement signal 250 based on the first reference frequency 252 and the second reference frequency 254. As shown in FIG. 4, the reference module 204 includes a first oscillator 404 to produce the first reference frequency 252 and a second oscillator 406 to produce the second reference frequency 254. However, this example is not limiting, those skilled in the relevant art(s) will recognize that the clock generator 204 may produce the first reference frequency 252 and/or the second reference frequency 254 using any suitable means without departing from the spirit and scope of the present invention. For example, the clock generator 204 may include one or more oscillation circuits to produce the first reference frequency 252 and/or the second reference frequency 254. In an exemplary embodiment, the second oscillator 406 produces a 1080 MHz pulse. In another exemplary embodiment, the first oscillator 404 may be locked in phase and/or frequency to the second oscillator 406 using a phase locked loop and/or a frequency locked loop. A buffer amplifier 402 amplifies the DPM gain measurement signal 250 to produce an amplified DPM gain measurement signal 452. In an exemplary embodiment, the buffer amplifier 402 is implemented as a source-follower amplifier. The summing network 206 and/or the buffer amplifier 402 provide isolation between the gain measurement signal embedded communication signal 258 and the DPM Signal Generator 202.

The Set-top Device 400 embeds the amplified DPM gain measurement signal 452 onto the received downstream multi-channel communication signal 256 using the summation network 206 to produce the gain measurement signal embedded communication signal 258. More specifically, the summation network 206 combines the amplified DPM gain measurement signal 452 with the received downstream multi-channel communication signal 256 to produce the gain measurement signal embedded communication signal 258. Thus, the gain measurement signal embedded communication signal 258 includes the received downstream multi-channel communication signal 256 having the unknown power level and the amplified DPM gain measurement signal 452 having the known power level. As shown in FIG. 4, the summation network 206 is implemented as a resistive summing network formed by a resistor 408 and a resistor 410. In an exemplary embodiment, the resistor 408 is 1.5 kohms and the resistor 410 is 75 ohms. A harmonic rejection filter 412 suppresses undesirable harmonics from the gain measurement signal embedded communication signal 258 to produce a filtered gain measurement signal embedded communication signal 452.

After embedding the DPM gain measurement signal onto the downstream multi-channel communication signal, the Set-top Device 400 downconverts the filtered gain measurement signal embedded communication signal 452 to produce the desired communication channel 260 using the mixer 208. Thus, the desired communication channel 260 includes a first component representing a representation of the received downstream multi-channel communication signal 256 having the unknown power level and a second component representing a representation of the DPM gain measurement signal 250 having the known power level.

A channel selection filter 414 filters the desired communication channel 260 to produce a filtered desired communication channel 454. More specifically, the channel selection filter 414 removes one or more undesired or unwanted communication channels and/or out of band interference and/or noise from the desired communication channel 260 to produce the filtered desired communication channel 454. For example, for a desired communication channel 260 corresponding to DCATV channel 1, the channel selection filter 414 filters the DCATV channel 2 through DCATV channel 53 from the desired communication channel 260. A variable gain amplifier (VGA) 416 amplifies the filtered desired communication channel 454 to an amplified communication channel 456. The Set-top Device 400 may adjust the gain of the Set-top Device 400 using the VGA 416 to ensure compliance with the DOCSIS specification.

An analog to digital converter (ADC) 418 converts the amplified communication channel 456 from an analog representation to a digital representation to produce a digitized communication channel 458. Thus, the digitized communication channel 458 includes a first component representing a representation of the received downstream multi-channel communication signal 256 having the unknown power level and a second component representing a representation of the DPM gain measurement signal 250 having the known power level.

The Set-top Device 400 calculates a desired input power for a communication channel in the received downstream multi-channel communication signal 256 based on a gain of the Set-top Device 400 and a power level of the digitized communication channel 458. More specifically, a post-processor module 214 measures a power level of the second component of the digitized communication channel 458 to determine the gain of the Set-top Device 400. The gain of the Set-top Device 400 may be represented as:

$$G = d' - A, \quad (5)$$

where G represents the Set-top Device gain in dB, d' represents the power level of the second component of the digitized communication channel 458, and A represents the known power level derived from DPM gain measurement signal 250 by the summation network 206.

The Set-top Device 400 determines the input power for the received downstream multi-channel communication signal 256. More specifically, the post-processor module 214 measures a power level of the first component of the digitized communication channel 458. The post-processor module 214 calculates the input power for the desired channel in the received downstream multi-channel communication signal 256 based on the gain of the Set-top Device 400 and the power level of the first component of the digitized communication channel 458. More specifically, the input power for the desired channel in the received downstream multi-channel communication signal 256 may be represented as:

$$x = c' - G, \quad (6)$$

where x represents the input power for the desired channel in the received downstream multi-channel communication signal 256, c' represents the power level of the first component of the digitized communication channel 458, and G represents the gain of the Set-top Device 400 from (5). However, those skilled in the relevant art(s) will recognize that (6) may be implemented differently in accordance with the teachings herein in the presence of the external amplifier 420 without departing from the sprit and scope of the present invention. The gain of the external amplifier 420 may be accurately determined using a look-up table or any other suitable means.

The post-processor module 214 produces recovered broadcast information 262 based on the digitized communication channel 458. The recovered broadcast 262 includes recovered information, such as audio, video, graphics, and/or data to provide some examples, from the desired communication channel 260. For example, the recovered broadcast information 262 may include a recovered representation of the video signal, audio signal, and/or graphics information of the broadcast for a desired DCATV channel, such as DCH1 to provide an example. Alternatively, the recovered broadcast information 262 may include a recovered representation of QAM modulated data for a desired DCATV channel, such as DCH1 to provide an example.

Although the DPM gain measurement signal 250 has been described in reference to calculating the input power for the communication channel in the received downstream multi-channel communication signal 256, those skilled in the relevant art(s) will recognize that the DPM gain measurement signal 250 may also be used to calculate or tune a signal path frequency response of the Set-top Device 400 without departing from the spirit and scope of the present invention. From the discussion above, the post-processor module 214 measures the power level of the second component of the digitized communication channel 458. The post-processor module 214 may measure the power level of the second component of the digitized communication channel 458 for a range of corresponding frequencies of the DPM gain measurement signal 250. The Set-top Device 400 may adjust the DPM gain measurement signal 250 among the range of corresponding frequencies to calculate or tune the signal path frequency response based upon the power level of the second component of the digitized communication channel 458. In an exemplary embodiment, an ability of the Set-top Device 400 to receive the received downstream multi-channel communication signal 256 is disabled. In other words, the Set-top Device 400 does not receive the received downstream multi-channel communication signal 256.

4. DPM Gain Measurement Signal

Figure 5:
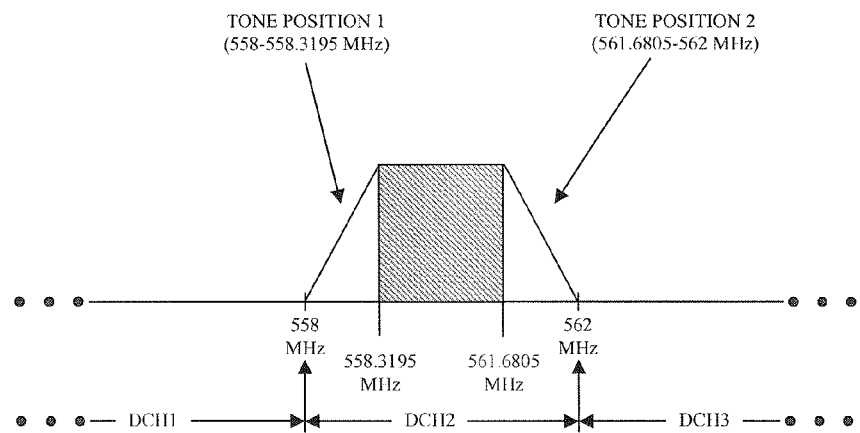
FIG. 5 illustrates a placement of a DPM gain measurement signal in the individual channel of the digital cable television (DCATV) broadcast band for North America.

FIG. 5 illustrates a placement of a DPM gain measurement signal in a corresponding channel of the digital cable television (DCATV) broadcast band for North America. More specifically, placement of the DPM gain measurement signals in the DCATV channel 2, denoted as DCH2, is shown in greater detail in FIG. 5. However, this example is not limiting, those skilled in the relevant art(s) will recognize that this example is solely used to illustrate the embedding of a DPM gain measurement signal onto a DCATV channel.

A Set-top Device, such as the Set-top Device 200 or the Set-top Device 400 may embed a DPM gain measurement signal, such as the DPM gain measurement signal 250, onto a passband of the respective DCATV channel. A first tone position, denoted as tone position 1, may extend from a lower bound of the respective DCATV channel to a lower bound of the broadcast signal. A second tone position, denoted as tone position 2, may extend from an upper bound of the respective DCATV channel to an upper bound of the broadcast signal. The spectral region from the lower bound of the respective DCATV channel to the lower bound of the bandwidth of the broadcast signal and/or the spectral region from the upper bound of the broadcast signal to the upper bound of the respective DCATV channel may be referred to as the passband of the respective DCATV channel.

For example, for DCATV channel DCH2 includes a 256 quadrature amplitude modulated (QAM) broadcast signal having a bandwidth of 5.361 MHz, the first tone position may extend from a lower bound of the DCATV channel, namely 558 MHz, to a lower bound of the 256 QAM broadcast signal, namely 558.3195. Likewise, the second tone position may extend from an upper bound of the 256 QAM broadcast signal, namely 561.6805 MHz, to an upper bound of DCATV channel, namely 562 MHz. However, those skilled in the relevant art(s) may embed the DPM gain measurement signal differently for different types of broadcast signals in accordance with the teachings herein without departing from the spirit and scope of the present invention. For example, the DCATV channel may include a 64 QAM broadcast signal having a bandwidth of 5.057 MHz.

5. DPM Gain Measurement Signal Generator

Figure 6:
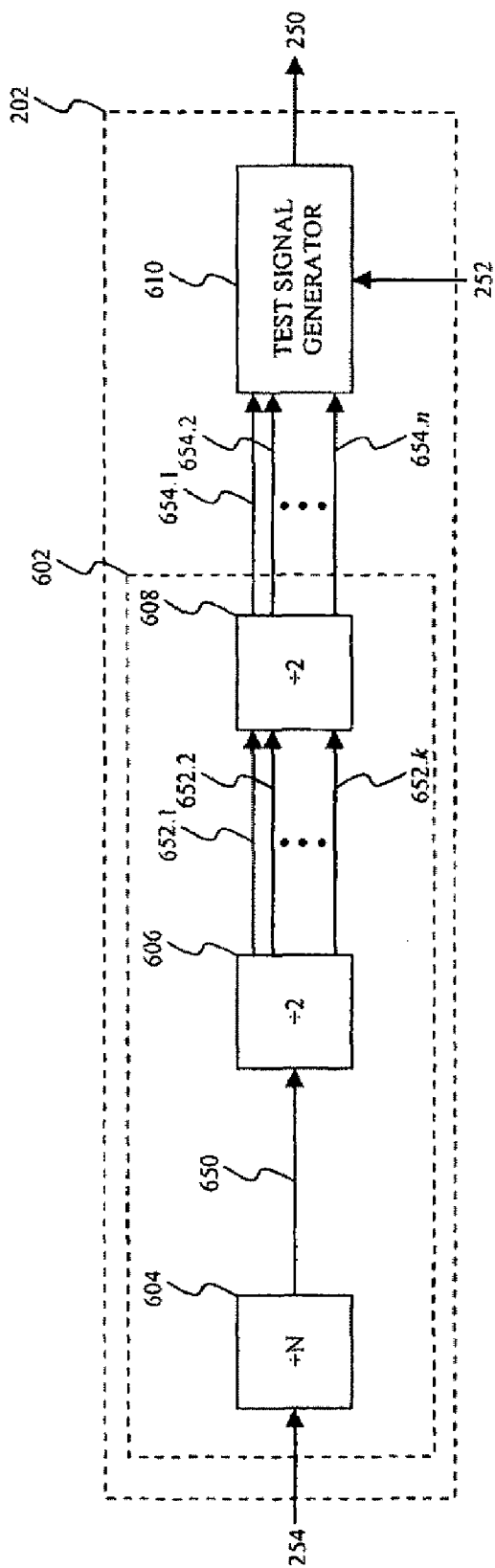
FIG. 6 illustrates a block diagram of a DPM gain measurement signal generator according to an exemplary embodiment of the present invention.

FIG. 6 illustrates a block diagram of a DPM gain measurement signal generator according to an exemplary embodiment of the present invention. The DPM Signal Generator 202 produces the DPM gain measurement signal 250 based on the first reference frequency 252 and the second reference frequency 254.

As shown in FIG. 6, the DPM Signal Generator 202 includes a reference divider 602. The reference divider 602 derives offset frequencies 654.1 through 654.$n$ by dividing down the second reference frequency 254. The reference divider 602 includes a counter module 604 to divide the second reference frequency 254 by a variable divide ratio to produce a first divided reference frequency 650. In an exemplary embodiment, the counter module 604 may be implemented as a programmable counter to divide the second reference frequency 254 by an integer value from 2 to 257. In another exemplary embodiment, the counter module 604 may be programmed to produce the DPM gain measurement signal 250 having a frequency from 1 MHz to over 25 MHz with respect to the first reference frequency 252.

A first divide-by-2 circuit 606 divides the first divided reference frequency 650 by 2 to produce second divided reference frequencies 652.1 through 652.$k$. The second divided reference frequencies 652.1 through 652.$k$ are substantially similar in frequency, but offset in phase. In an exemplary embodiment, the first divide-by-2 circuit 606 produces the second divided reference frequencies 652.1 through 652.2. In another exemplary embodiment, the second divided reference frequency 652.1 and the second reference frequency 652.2 are offset in phase by 90 degrees.

A second divide-by-2 circuit 608 divides the second divided reference frequencies 652.1 through 652.$k$ by 2 to produce the offset frequencies 654.1 through 654.$n$. The offset frequencies 654.1 through 654.$n$ are substantially similar in frequency, but offset in phase. In an exemplary embodiment, the second divide-by-2 circuit 608 produces the offset frequencies 654.1 through 654.3. In another exemplary embodiment, the offset frequency 654.1, the offset frequency 654.2, and the offset frequency 654.3 are offset in phase by 45 degrees.

A frequency of a corresponding offset frequency 654.1 through 654.$n$ may be expressed as:

$$\text{offset\_frequency (MHz)} = \frac{\text{reference\_frequency(MHz)}}{N*2*2} \quad (7)$$

where offset_frequency represents the frequency of the corresponding offset frequency 654.1 through 65.$n$ in MHz, reference_frequency represents a frequency of the second reference frequency 254, and two divide-by-2 represent operations of the first divide-by-2 circuit 606 and the second divide-by-2 circuit 608 respectively. In an exemplary embodiment, the reference divider 602 derives the offset frequencies 654.1 through 654.$n$ by dividing down the second reference frequency 254 of 1080 MHz as shown in the table below.

| N | offset frequency (MHz) |
|---|---|
| 257 | 1.051 |
| 256 | 1.055 |
| 255 | 1.059 |
| ... | ... |
| 91 | 2.967 |
| 90 | 3.000 |
| 89 | 3.034 |
| ... | ... |
| 68 | 3.971 |
| 67 | 4.030 |
| 66 | 4.091 |
| ... | ... |
| 4 | 67.500 |
| 3 | 90.000 |
| 2 | 135.000 |

However, this example is not limiting, those skilled in the relevant art(s) will recognize the reference frequency of 1080 MHz is solely used to illustrate the operation of one embodiment of the reference divider 602. For example, those skilled in the relevant art(s) may divide down any suitable frequency for the second reference frequency 254 differently in accordance with the teachings herein without departing from the spirit and scope of the present invention.

Referring back to FIG. 6, a test-signal generator 610 produces the DPM gain measurement signal 250 based on the first reference frequency 252 and the offset frequencies 654.1 through 654.$n$. More specifically, the test-signal generator 610 mixes or multiplies the first reference frequency 252 and one or more of the offset frequencies 654.1 through 654.$n$ to produce the DPM gain measurement signal 250. The frequency of the DPM gain measurement signal 250 may be given as:

$$DPM\_signal = carrier\_frequency + offset\_frequency, \quad (8)$$

or $$DPM\_signal = carrier\_frequency - offset\_frequency, \quad (9)$$

where DPM_signal represents the frequency of the DPM gain measurement signal 250 in MHz, carrier_frequency represents the frequency of the first reference frequency 252 in MHz, and offset_frequency represents the frequency of the offset frequencies 654.1 through 654.$n$ in MHz. The test-signal generator 610 is further described in FIG. 8 through 9E.

Figure 7:
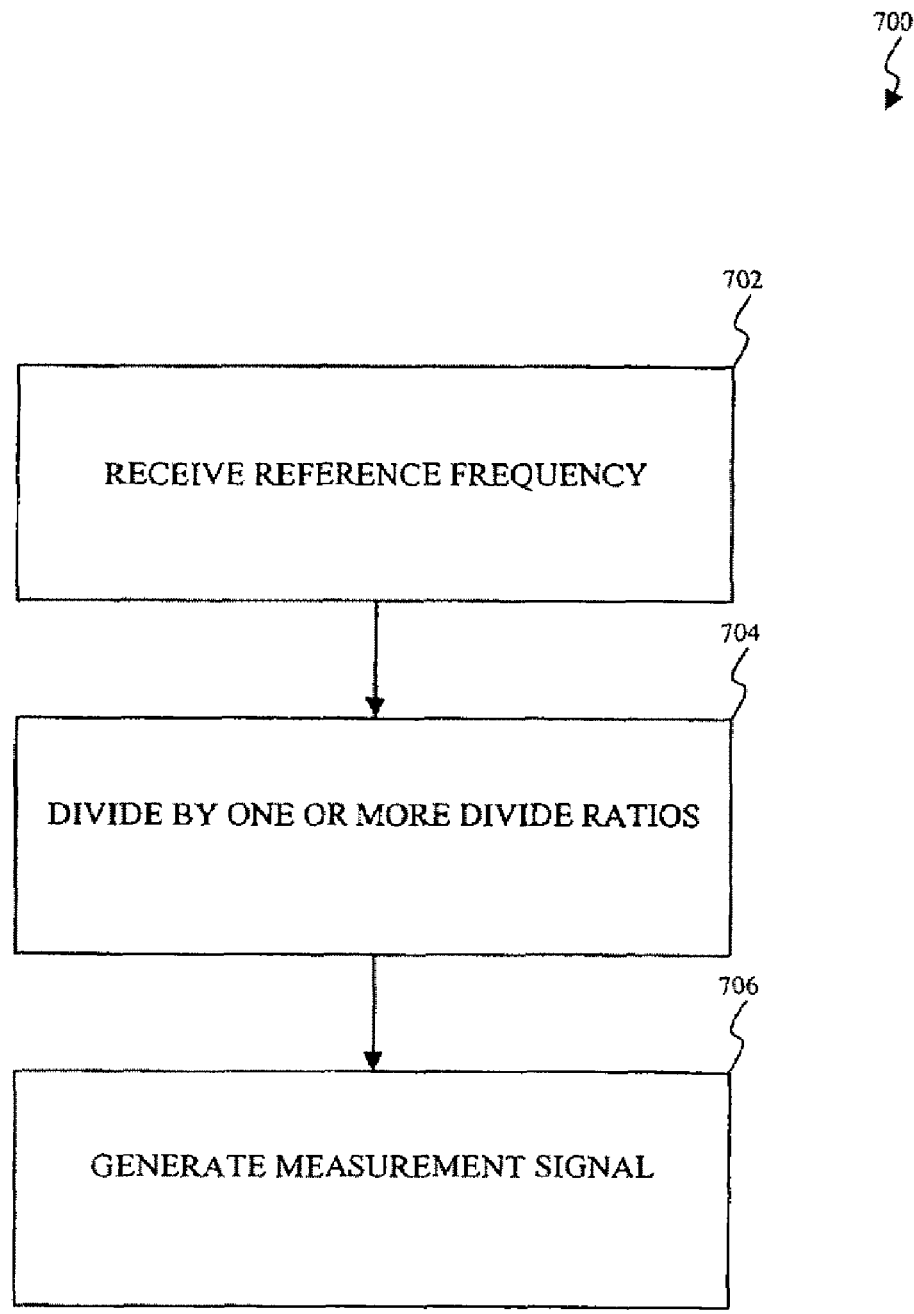
FIG. 7 is a flowchart of exemplary operational steps of a DPM gain measurement signal generator according to an exemplary embodiment of the present invention.

FIG. 7 is a flowchart 700 of exemplary operational steps of a DPM gain measurement signal generator according to an exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 7.

At step 702, a first reference frequency, such as the second reference frequency 254 to provide an example, is received. A DPM gain measurement signal generator, such as the DPM Signal Generator 202 to provide an example, may receive the reference frequency.

At step 704, the first reference frequency from step 702 is divided by one or more divide ratios to produce one or more offset frequencies. A reference divider, such as the reference divider 602 to provide an example, may divide the first reference frequency from step 702 by one or more divide ratios to produce the one or more offset frequencies. The reference divider may divide the first reference frequency from step 702 using one or more variable dividers, such as the counter module 604 to provide an example, and/or one or more fixed dividers, such as the first divide-by-2 circuit 606 or the second divide-by-2 circuit 608 to provide some examples.

At step 706, a measurement signal is produced by mixing or multiplying the one or more offset frequencies from step 704 by one or more second reference frequencies, such as the first reference frequency 252 to provide an example. A test-signal generator, such as the test-signal generator 610 to provide an example, may mix or multiply the one or more offset frequencies and the second reference frequency to produce the measurement signal.

5.1 Test-Signal Generator

Figure 8:
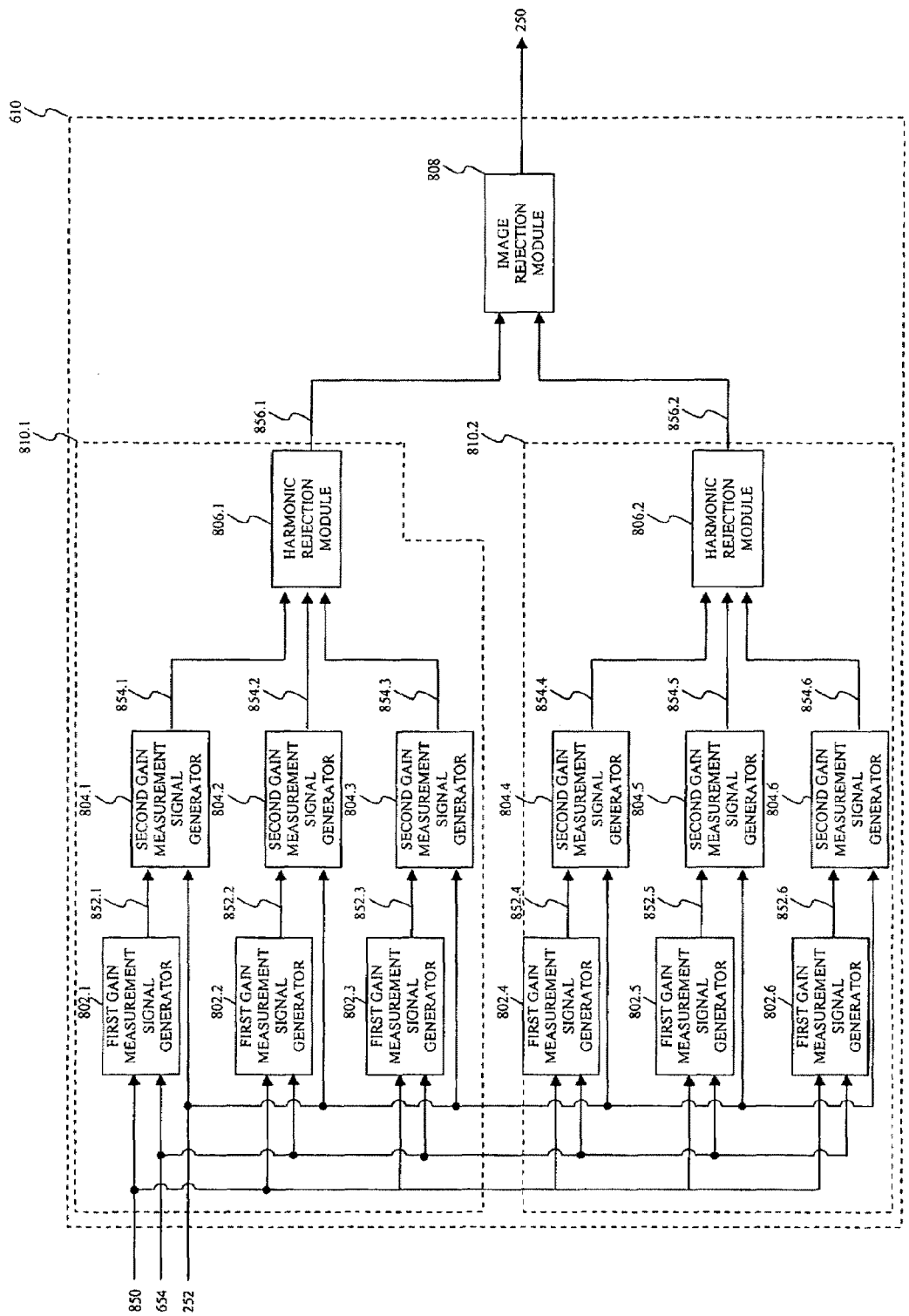
FIG. 8 illustrates a block diagram of a test-signal generator according to an exemplary embodiment of the present invention.

FIG. 8 illustrates a block diagram of a test-signal generator according to an exemplary embodiment of the present invention. From the discussion of FIG. 6, the test-signal generator 610 produces the DPM gain measurement signal 250 based on the first reference frequency 252 and the offset frequency 654.

The test-signal generator 610 includes a DPM test-signal generator 810 and an image rejection module 808. The DPM test-signal generator 810 receives the offset frequency 654, a direct current (DC) bias 850, and/or the first reference frequency 252. The offset frequency 654 may include the offset frequencies 654.1 through 654.n. The offset frequencies 654.1 through 654.n have a substantially similar frequency, but are offset in phase. Likewise, the DC bias 850 may include DC biases 850.1 through 850.i. A corresponding DC bias 850.1 through 850.n may have a substantially similar and/or different magnitudes and/or phases from other corresponding DC biases 850.1 through 850.i. In an exemplary embodiment, the DC bias 850 may include either a DC current and/or a DC voltage. In another exemplary embodiment, the DC bias 850 may be derived from a bandgap voltage reference in either the Set-top Device 200 or the Set-top Device 400. The bandgap voltage reference and/or a suitable equivalent, such as a stable DC bias to provide an example, allows for an amplitude of the DPM gain measurement signal 250 to be controlled accurately to a known level without any substantial process and temperature dependency. In a further exemplary embodiment, the DC bias 850.1 may be implemented using a current source with a magnitude of i, the DC bias 850.2 may be implemented using a current source with a magnitude of $\sqrt{2}*i$, and the DC bias 850.3 may be implemented using a current source with a magnitude of i.

As shown in FIG. 8, the DPM test-signal generator 810 includes a DPM test-signal generator 810.1 and a DPM test-signal generator 810.2. However, this example is not limiting, those skilled in the relevant art(s) will recognize that the DPM test-signal generator 810 may include any suitable number of DPM test-signal generators 810 without departing from the spirit and scope of the present invention. The DPM test-signal generator 810.1 produces a DPM gain measurement signal 856.1 based on the offset frequency 654, the direct current DC bias 850, and the first reference frequency 252. The DPM test-signal generator 810.1 includes first gain measurement signal generators 802.1 through 802.3 to produce first gain measurement signals 852.1 through 852.3. A corresponding first gain measurement signal generator 802.1 through 802.3 produces a corresponding first gain measurement signal 852.1 through 852.3 based on the offset frequency 654 and the DC bias 850. More specifically, the corresponding first gain measurement signal generator 802.1 through 802.3 mixes or multiplies the DC bias with the offset frequency. In an exemplary embodiment, the first gain measurement signals 852.1 through 852.3 have substantially similar frequency and/or phase characteristics as a corresponding offset frequency 654.1 through 654.n.

The DPM test-signal generator 810.1 additionally includes second gain measurement signal generators 804.1 through 804.3 to produce second gain measurement signals 854.1 through 854.3. A corresponding second gain measurement signal generator 804.1 through 802.3 produces a corresponding second gain measurement signal 854.1 through 854.3 based on the corresponding first gain measurement signal 852.1 through 852.3 and the first reference frequency 252. More specifically, the corresponding second gain measurement signal generator 804.1 through 802.3 mixes or multiplies the corresponding the corresponding first gain measurement signal 852.1 through 852.3 with the first reference frequency 252. In an exemplary embodiment, the second gain measurement signals 854.1 are substantially similar in frequency, but are offset in phase. In another exemplary embodiment, the second gain measurement signal 854.1, the second gain measurement signal 854.2, and the second gain measurement signal 854.3 are offset in phase by 45 degrees.

Those skilled in the relevant art(s) will recognize that the DPM test-signal generator 810.1 produces the second gain measurement signals 854.1 through 854.3 using a double conversion scheme. However, this example is not limiting, those skilled in the relevant art(s) will recognize that the second gain measurement signals 854.1 through 854.3 may be produced using any suitable conversion scheme without departing from the spirit and scope of the present invention. For example, the second gain measurement signals 854.1 through 854.3 may be produced by directly mixing or multiplying the corresponding offset frequency 654.1 through 654.3 with the first reference frequency 252.

The DPM test-signal generator 810.1 further includes a harmonic rejection module 806.1 to produce the DPM gain measurement signal 856.1. More specifically, the harmonic rejection module 806 substantially reduces harmonic content from the gain measurement signals 854.1 through 854.3 to produce the DPM gain measurement signal 856.1. The frequency of the DPM gain measurement signal 856.1 may be given as:

$$DPM\_signal = carrier\_frequency \pm offset\_frequency, \qquad (10)$$

where DPM_signal represents the DPM gain measurement signal 856.1 and/or the DPM gain measurement signal 856.2 in MHz, carrier_frequency represents the frequency of the first reference frequency 252 in MHz, and offset_frequency represents the frequency of the offset frequencies 654.1 through 654.n in MHz. The harmonic rejection module 806.1 is further described in FIG. 9A through 9D.

The DPM test-signal generator 810.2 produces a DPM gain measurement signal 856.2 based on the offset frequencies 654.1 through 654.3, the DC biases 850.1 through 850.3, and the first reference frequency 252. The DPM test-signal generator 810.2 operates in a manner substantially similar to the DPM test-signal generator 810.1, as will be apparent to those skilled in the relevant art(s), and therefore will not be described in further detail herein.

The image rejection module 808 produces the DPM gain measurement signal 250 based on the DPM gain measurement signal 856.1 and the DPM gain measurement signal 856.2. As shown in (9), the DPM gain measurement signal 856.1 and the DPM gain measurement signal 856.2 are substantially similar in frequency however, the DPM gain measurement signal 856.1 and the DPM gain measurement signal 856.2 are offset in phase. In an exemplary embodiment, the DPM gain measurement signal 856.1 and the DPM gain measurement signal 856.2 are offset in phase by 90 degrees. The image rejection module 808 combines the DPM gain measurement signal 856.1 and the DPM gain measurement signal 856.2 to produce the DPM gain measurement signal 250. The DPM gain measurement signal 250 may be represented as:

$$DPM\_signal = carrier\_frequency + offset\_frequency, \qquad (11)$$

or $$DPM\_signal = carrier\_frequency - offset\_frequency, \qquad (12)$$

where DPM_signal represents the frequency of the DPM gain measurement signal 250 in MHz, carrier_frequency represents the frequency of the first reference frequency 252 in MHz, and offset_frequency represents the frequency of the offset frequencies 654.1 through 654.n in MHz. The image rejection module 808 is further described in FIG. 9E.

FIG. 9A illustrates a harmonic rejection module according to an embodiment of the present invention. As shown in FIG. 9A, the harmonic rejection module 806 produces the DPM gain measurement signal 856 based on the second gain measurement signals 854.1 through 854.*n*. More specifically, the harmonic rejection module 806 combines the second gain measurement signals 854.1 through 854.*n* to produce the DPM gain measurement signal 856. The harmonic rejection module 806 may combine the second gain measurement signals 854.1 through 854.*n* using an active summing network, a passive summing network, hard-wiring, and/or any other suitable manner capable of combining the second gain measurement signals 854.1 through 854.*n*.

FIG. 9B illustrates an operation of the harmonic rejection module according to an embodiment of the present invention. As shown in FIG. 9B, the second gain measurement signals 854.1 through 854.*n* are substantially similar in frequency but offset in phase. For example, the second gain measurement signal 854.1 is offset in phase from the second gain measurement signal 854.2 by $\phi_1$. Likewise, the second gain measurement signal 854.*n*-1 is offset in phase from the second gain measurement signal 854.*n* by $\phi_n$.

As shown in FIG. 9B, the respective offset in phases of the second gain measurement signals 854.1 through 854.*n* allow the second gain measurement signals 854.1 through 854.*n* to be combined to form the DPM gain measurement signal 856. For example, at a first instant in time denoted as $t_1$, the second gain measurement signal 854.1 is at a maximum value while the second gain measurement signals 854.2 through 854.*n* are at their respective minimum values. Combining the second gain measurement signals 854.1 through 854.*n* at the first instant in time produces the DPM gain measurement signal 856 having a magnitude substantially similar to the second gain measurement signal 854.1. Likewise, at a second instant in time denoted as $t_2$, the second gain measurement signals 854.1 and 854.2 are at their respective maximum values while the second gain measurement signals 854.3 through 854.*n* are at their respective minimum values. Combining the second gain measurement signals 854.1 through 854.*n* at the second instant in time produces the DPM gain measurement signal 856 having a magnitude substantially similar to combination of the second gain measurement signals 854.1 and 854.2. The magnitude of the DPM gain measurement signal 856 at the second instant in time is substantially greater than the magnitude of the DPM gain measurement signal 856 at the first instant in time. Finally, at an $n^{th}$ instant in time denoted as $t_n$, the second gain measurement signals 854.1 and 854.*n* are at their respective maximum values. Combining the second gain measurement signals 854.1 through 854.*n* at the $n^{th}$ instant in time produces the DPM gain measurement signal 856 having a magnitude substantially similar to combination of the second gain measurement signals 854.1 and 854.*n*.

FIG. 9C illustrates another operation of the harmonic rejection module according to an embodiment of the present invention. As shown in FIG. 9C, the second gain measurement signal 854.1 through 854.3 are substantially similar in frequency but offset in phase. For example, the second gain measurement signal 854.1 is offset in phase from the second gain measurement signal 854.2 by $\phi_1$. Likewise a second gain measurement signal 854.3 is offset in phase from the second gain measurement signal 854.2 by $\phi_2$.

As shown in FIG. 9C, the respective offset in phases of the second gain measurement signals 854.1 through 854.3 allow the individual second gain measurement signals 854.1 through 854.3 to be combined to form a quasi-sinusoidal signal known as the DPM gain measurement signal 856. For example, at a first instant in time denoted as $t_1$, the second gain measurement signal 854.1 is at a maximum value while the second gain measurement signals 854.2 through 854.3 are at their respective minimum values. Combining the second gain measurement signals 854.1 through 854.3 at the first instant in time produces the DPM gain measurement signal 856 having a magnitude substantially similar to the second gain measurement signal 854.1.

At a second instant in time denoted as $t_2$, the second gain measurement signals 854.1 and 854.2 are at their respective maximum values while the second gain measurement signal is at a respective minimum value. Combining the second gain measurement signals 854.1 through 854.3 at the second instant in time produces the DPM gain measurement signal 856 having a magnitude substantially similar to combination of the second gain measurement signals 854.1 and 854.2. The magnitude of the DPM gain measurement signal 856 at the second instant in time is substantially greater than the magnitude of the DPM gain measurement signal 856 at the first instant in time.

At a third instant in time denoted as $t_3$ and/or a fourth instant in time denoted as $t_4$, the second gain measurement signals 854.1 through 854.3 are at their respective maximum values. Combining the second gain measurement signals 854.1 through 854.3 at the third instant in time and/or the fourth instant in time produces the DPM gain measurement signal 856 having a magnitude substantially similar to the combination of the second gain measurement signals 854.1 through 854.3.

At as fifth instant in time denoted as $t_5$, the second gain measurement signal 854.1 is at a respective minimum value while the second gain measurement signals 854.2 through 854.3 are at their respective maximum values. Combining the second gain measurement signals 854.1 through 854.3 at the fifth instant in time produces the DPM gain measurement signal 856 having a magnitude substantially similar to the combination of the second gain measurement signals 854.2 through 854.3.

Finally, at as sixth instant in time denoted as $t_6$, the second gain measurement signals 854.1 through 854.2 are at their respective minimum values, while the second gain measurement signal 854.3 is at a respective maximum value. Combining the second gain measurement signals 854.1 through 854.3 at the third instant in time produces the DPM gain measurement signal 856 having a magnitude substantially similar to the combination of the second gain measurement signal 854.3.

FIG. 9D illustrates a further operation of the harmonic rejection module according to an embodiment of the present invention. As shown in the FIG. 9D, the second gain measurement signals 854.1 through 854.*n* may be represented by a fundamental or center frequency $f_c$ and one or more harmonics $3*f_c$, $5*f_c$, and $7*f_c$. However, this example is not limiting, those skilled in the relevant art(s) will recognize that the second gain measurement signals 854.1 through 854.3 may contain any integer multiple of the fundamental or center frequency $f_c$ without departing from the spirit and scope of the present invention.

Referring back to FIG. 9D, the combination of the second gain measurement signals 854.1 through 854.*n* produces the DPM gain measurement signal 856 having a substantial reduction in harmonics of the fundamental or center frequency $f_c$ when compared to the second gain measurement signals 854.1 through 854.*n*. In the embodiment shown in FIG. 9D, the DPM gain measurement signal 856 includes a harmonic at $7*f_c$ only, whereas each of the second gain measurement signals 854.1 through 854.*n* includes harmonics at $3*f_c$, $5*f_c$, and $7*f_c$.

Figure 9E:
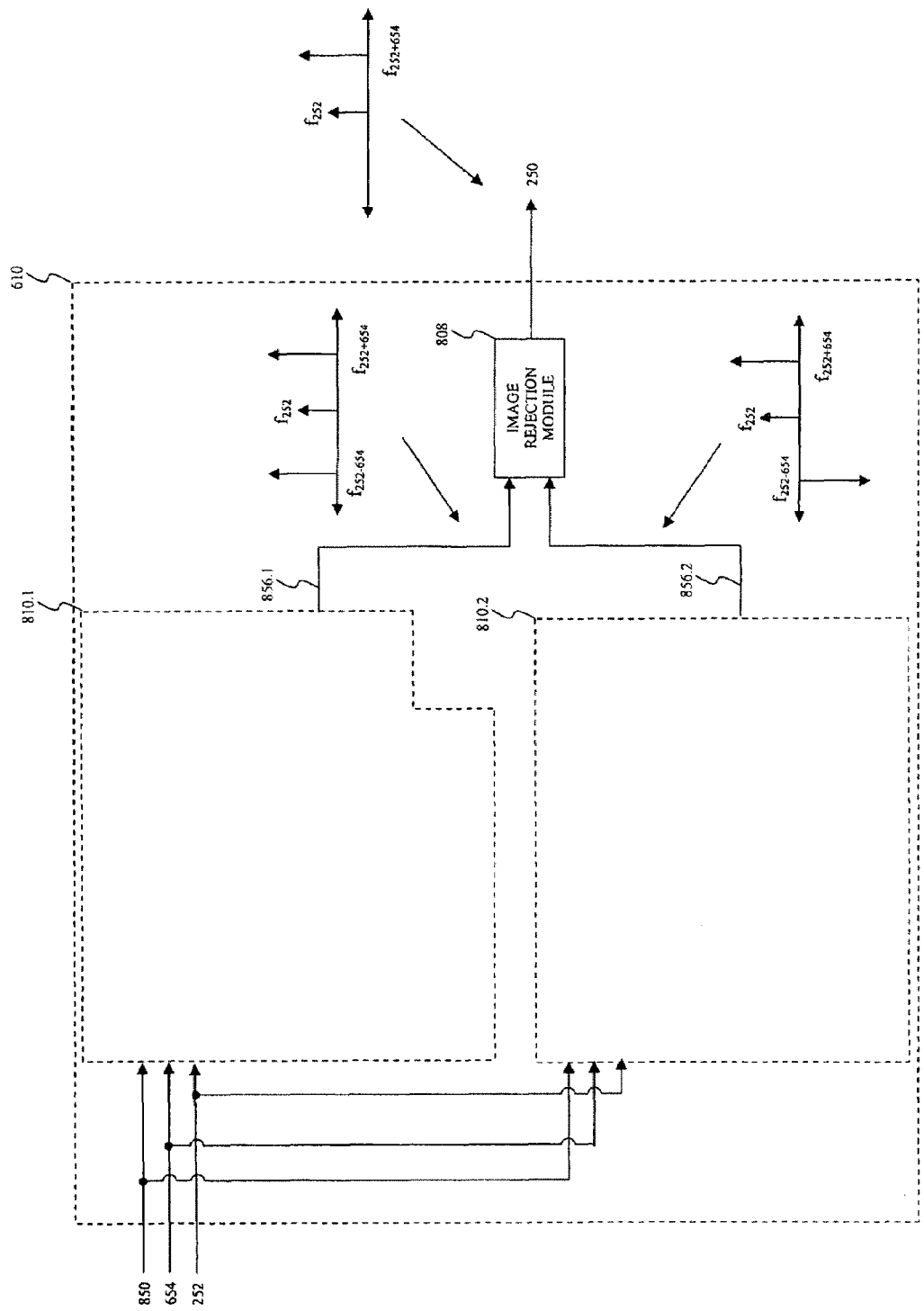
FIG. 9E illustrates an image rejection module according to an embodiment of the present invention.

FIG. 9E illustrates an image rejection module according to an embodiment of the present invention. From the discussion above, the DPM test-signal generator 810.1 produces the DPM gain measurement signal 856.1 based on the offset frequencies 654.1 through 654.n, the DC biases 850.1 through 850.n, and the first reference frequency 252. The frequency of the DPM gain measurement signal 856.1 may be given as:

$$DPM\_signal = carrier\_frequency \pm offset\_frequency, \quad (13)$$

where DPM_signal represents the DPM gain measurement signal 856.1 in MHz, carrier_frequency represents the frequency of the first reference frequency 252 in MHz, and offset_frequency represents the frequency of the offset frequencies 654.1 through 654.n in MHz. Likewise, the DPM test-signal generator 810.2 produces the DPM gain measurement signal 856.2 based on the offset frequencies 654.1 through 654.n, the DC biases 850.1 through 850.n, and the first reference frequency 252. The frequency of the DPM gain measurement signal 856.2 may be given as:

$$DPM\_signal = carrier\_frequency \pm offset\_frequency, \quad (14)$$

where DPM_signal represents the DPM gain measurement signal 856.2 in MHz, carrier_frequency represents the frequency of the first reference frequency 252 in MHz, and offset_frequency represents the frequency of the offset frequencies 654.1 through 654.n in MHz. The offset frequencies 654.1 through 654.n, the DC biases 850.1 through 850.n, and/or the first reference frequency 252 may be chosen such that the difference product of the DPM gain measurement signal 856.1, namely, $f_{252-654}$, is substantially offset from the difference product of the DPM gain measurement signal 856.2, namely, $f_{252-654}$ by 180 degrees. For example, the offset frequencies 654.1 through 654.n, the DC biases 850.1 through 850.n, and/or the first reference frequency 252 may be separated a first group of in phase components and a second group of quadrature phase components, wherein a phase of a corresponding in phase component is substantially offset from a phase of a corresponding quadrature phase component by 90 degrees. In the mean time, the offset frequencies 654.1 through 654.n, the DC biases 850.1 through 850.n, and/or the first reference frequency 252 may be chosen such that the sum product of the DPM gain measurement signal 856.1, namely, $f_{252+654}$, is in-phase from the sum product of the DPM gain measurement signal 856.2, namely, $f_{252+654}$.

As shown in FIG. 9E, the image rejection module 808 produces the DPM gain measurement signal 250 based on the DPM gain measurement signal 856.1 and the DPM gain measurement signal 856.2. More specifically, image rejection module 808 combines the DPM gain measurement signal 856.1 and the DPM gain measurement signal 856.2 to produce the DPM gain measurement signal 250. The image rejection module 808 may combine the DPM gain measurement signal 856.1 and the DPM gain measurement signal 856.2 using an active summing network, a passive summing network, hard-wiring, and/or any other suitable manner capable of combining the second gain measurement signals 854.1 through 854.n.

As a result of the phase offset of either the sum component and/or the difference component, combining the DPM gain measurement signal 856.1 and the DPM gain measurement signal 856.2 substantially lessens either the sum component and/or the difference component such that the DPM gain measurement signal 250 may be represented as:

$$DPM\_signal = carrier\_frequency + offset\_frequency, \quad (15)$$

or $$DPM\_signal = carrier\_frequency - offset\_frequency, \quad (16)$$

where DPM_signal represents the frequency of the DPM gain measurement signal 250 in MHz, carrier_frequency represents the frequency of the first reference frequency 252 in MHz, and offset_frequency represents the frequency of the offset frequencies 654.1 through 654.n in MHz. FIG. 9E demonstrates a reduction in the difference component, however, those skilled in the relevant art(s) will recognize that the sum component may be lessened as well.

5.1.1 First Gain Measurement Signal Generator

Figure 10:
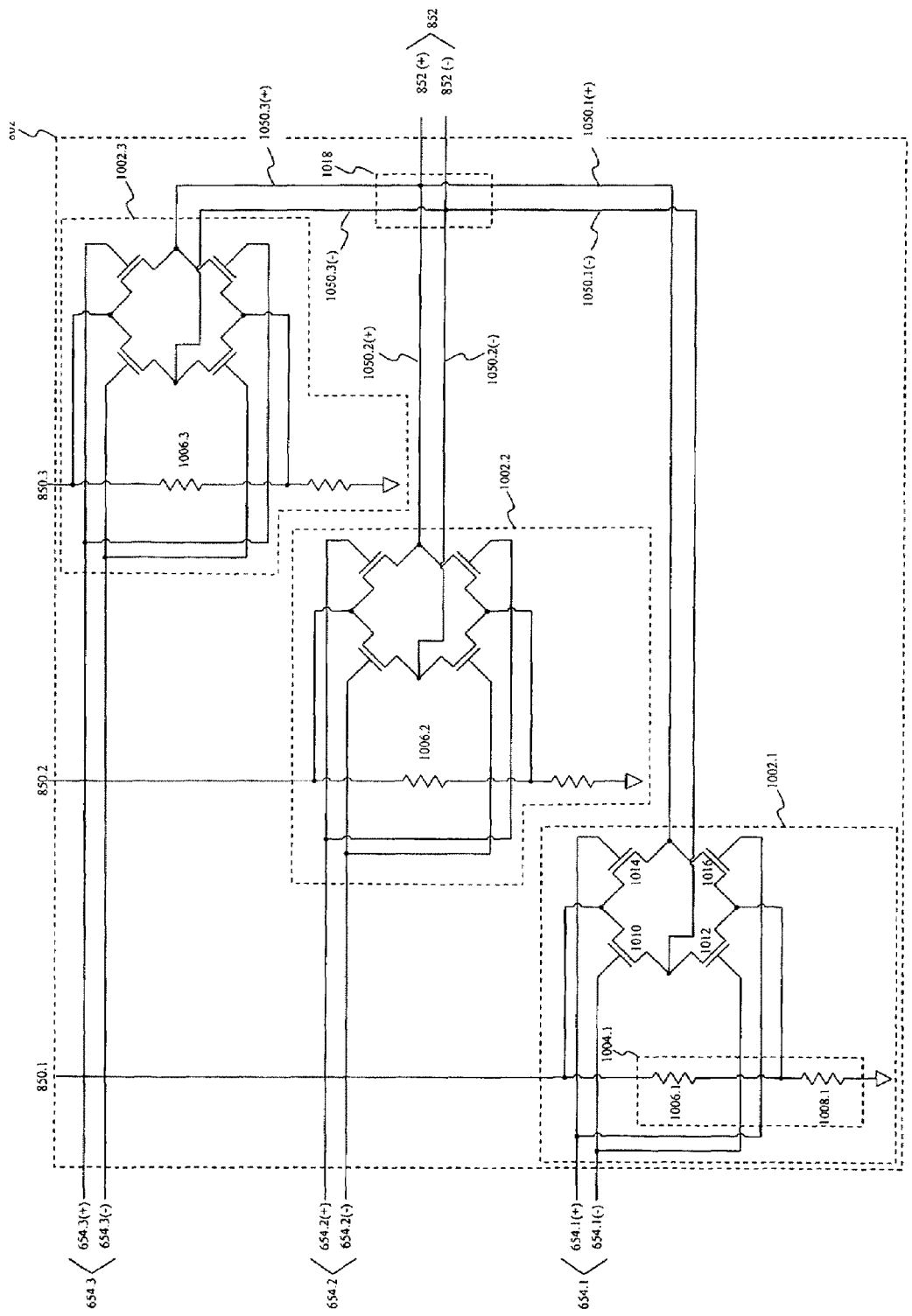
FIG. 10 illustrates a block diagram of a first gain measurement signal generator according to an exemplary embodiment of the present invention.

FIG. 10 illustrates a block diagram of a first gain measurement signal generator according to an exemplary embodiment of the present invention. The first gain measurement signal generator 802 represents an exemplary embodiment of the first gain measurement signal generators 802.1 through 802.6. From the discussion above, the first gain measurement signal generator 802 produces the first gain measurement signal 852 based on the offset frequency 654 and the DC bias 850. In the exemplary embodiment of FIG. 10, 852.1(+) and 852(−) represent a differential implementation of the first gain measurement signal 852. Likewise, 654.1(+) and 654.1(−), 654.2(+) and 654.2(−), and 654.3(+) and 654.3(−) represent a differential implementation of the offset frequencies 654.1 through 654.3.

As shown in FIG. 10, the first gain measurement signal generator 802 includes quad circuits 1002.1 through 1002.3. The quad circuits 1002.1 through 1002.3 produce a corresponding gain measurement signal 1050.1 through 1050.3 based upon a corresponding differential implementation of the offset frequencies 654.1 through 654.3 and a corresponding DC bias 850.1 through 850.3. For example, the quad-circuit 1002.1 produces the gain measurement signal 1050.1 based upon the differential implementation of the offset frequency 654.1 and a DC bias 850.1. In the exemplary embodiment of FIG. 10, 1050.1(+) and 1050.1(−), 1050.2(+) and 1050.2(−), and 1050.3(+) and 1050.3(−) represent a differential implementation of the gain measurement signals 1050.1 through 1050.3. Those skilled in the relevant art(s) will recognize that the quad-circuits 1002.1 through 1002.3 operate in a substantially similar manner, therefore only the quad-circuit 1002.1 is explained in further detail.

As shown in FIG. 10, the quad-circuit 1002.1 receives the DC bias 850.1. The DC bias 850.1 passes through a resistor network 1004.1 formed by a resistor 1006.1 and a resistor 1008.1. In an exemplary embodiment, the resistor 1006.1 and a resistor 1006.3 included in the quad-circuit 1002.2 are R ohms and a resistor 1006.2 included in the quad-circuit 1002.2 is $\sqrt{2}*R$ ohms.

The quad-circuit 1002.1 switches transistors 1010 through 1016 to produce the differential implementation of the gain measurement signals 1050.1 through 1050.3 based on the differential implementation of the offset frequency 654.1 and the DC bias 850.1. The transistors 1010 through 1016 may be implemented as, but not limited to, n-type metal-oxide-semiconductor field-effect transistors (NMOSFET) transistors, p-type metal-oxide-semiconductor field-effect transistors (PMOSFET), and/or a combination of NMOSFET and PMOSFET transistors. In an exemplary embodiment, NMOSFET may be used in place of the transistors 1010 through 1016. The transistors 1010 through 1016 are coupled to either the positive component of the offset frequency 654.1 (+) or the negative component of the offset frequency 654.1 (−). For example, the transistor 1010 connects to the negative component of the offset frequency 654.1(−). The positive component of the offset frequency 654.1(+) and/or the negative component of the offset frequency 654.1(−) activates and/or deactivates the transistors 1010 through 1016 to produce the differential implementation of the gain measurement signals 1050.1. The differential implementation of the gain measurement signals 1050.1 exhibits a substantially similar frequency as the differential representation of offset frequency 654.1.

For example, when the positive component of the offset frequency 654.1(+) corresponds to a maximum value, current passes through the transistors 1014 and 1016 to the positive component of the first gain measurement signal 852.1(+). The negative component of the offset frequencies 654.1(−) corresponds to a minimum value causing current not to flow through transistors 1010 and 1012 to the negative component of the first gain measurement signal 852.1(−). Likewise, when the negative component of the offset frequencies 654.1 (−) corresponds to a maximum value, current passes through the transistors 1010 and 1012 to the negative component of the first gain measurement signal 852.1(−). The positive component of the offset frequency 654.1(+) corresponds to a minimum value causing current not to flow through transistors 1014 and 1016 to the positive component of the first gain measurement signal 852.1(+).

The first gain measurement signal generator 802 additionally includes a harmonic rejection module 1018 to produce the first gain measurement signal 852.1 based on the gain measurement signals 1050.1 through 1050.3. More specifically, the harmonic and/or image rejection module 1018 substantially reduces harmonic and/or image content from the gain measurement signals 1050.1 through 1050.3 to produce the first gain measurement signal 852.1 as described in FIG. 9A through 9D.

5.1.2 Second Gain Measurement Signal Generator

Figure 11:
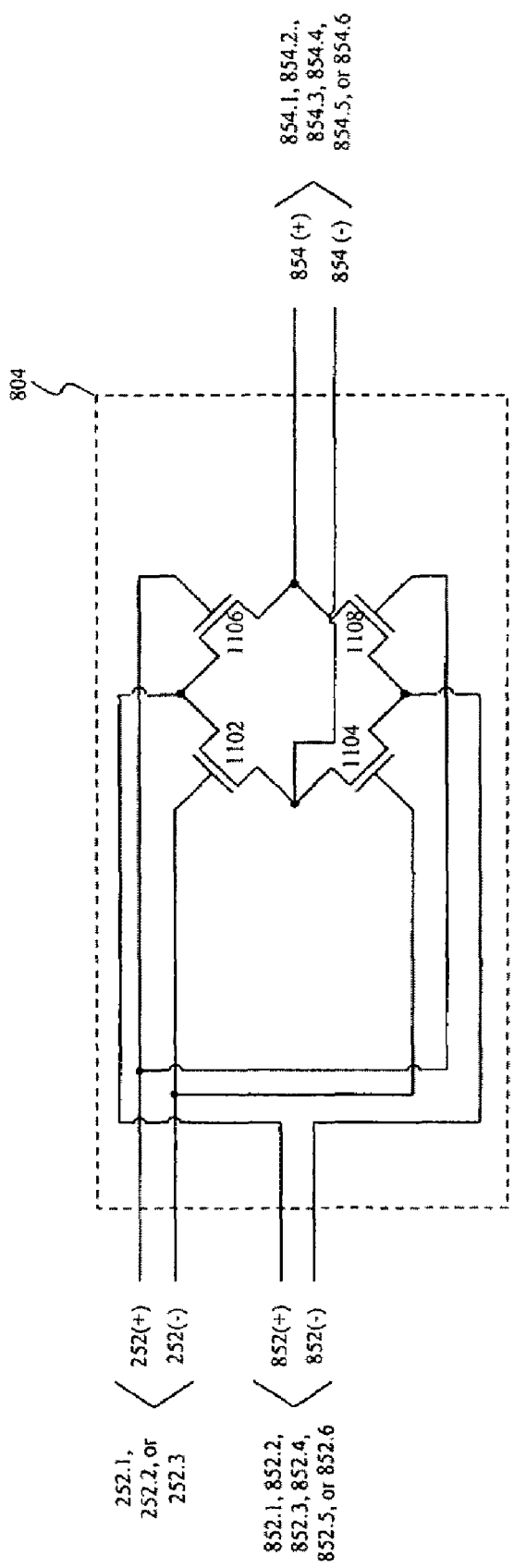
FIG. 11 illustrates a block diagram of a second gain measurement signal generator according to an exemplary embodiment of the present invention.

FIG. 11 illustrates a block diagram of a second gain measurement signal generator according to an exemplary embodiment of the present invention. The second gain measurement signal generator 804 represents an exemplary embodiment of the second gain measurement signal generators 804.1 through 804.6. From the discussion above, the second gain measurement signal generator 804 produces a corresponding second gain measurement signal 854.1 through 854.6 based on a corresponding first gain measurement signal 852.1 through 852.6 and the first reference frequency 252.

The first reference frequency 252 may include carrier frequencies 252.1 through 252.3. The carrier frequencies 252.1 through 252.3 are substantially similar in frequency but are offset in phase. A phase offset of a corresponding carrier frequency 252.1 through 252.3 is substantially similar to a phase offset of a corresponding offset frequency 654.1 through 654.3 and/or a corresponding first gain measurement signal 852.1 through 852.6.

In the exemplary embodiment of FIG. 11, 852(+) and 852 (−) represent a differential implementation of the first gain measurement signal 852. Likewise, 854(+) and 854(−) represent a differential implementation of the second gain measurement signal 854. Finally, 252(+) and 252(−) represent a differential implementation of the first reference frequency 252.

The second gain measurement signal generator 804.1 produces the second gain measurement signal 854.1 based on the first gain measurement signal 852.1 and the first reference frequency 252.1. Likewise, the second gain measurement signal generator 804.2 produces the second gain measurement signal 854.2 based on the first gain measurement signal 852.2 and the first reference frequency 252.2. Similarly, the second gain measurement signal generator 804.3 produces the second gain measurement signal 854.3 based on the first gain measurement signal 852.3 and the first reference frequency 252.3. The second gain measurement signal generator 804.3 produces the second gain measurement signal 854.3 based on the first gain measurement signal 852.3 and the first reference frequency 252.1. Likewise, the second gain measurement signal generator 804.4 produces the second gain measurement signal 854.4 based on the first gain measurement signal 852.4 and the first reference frequency 252.2. Similarly, the second gain measurement signal generator 804.6 produces the second gain measurement signal 854.6 based on the first gain measurement signal 852.6 and the first reference frequency 252.3.

As shown in FIG. 11, the second gain measurement signal generator 804 switches transistors 1102 through 1108 to produce the differential implementation of the second gain measurement signal 854 based on the differential representation of the differential representation of the first reference frequency 252. The transistors 1102 through 1108 may be implemented as, but not limited to, n-type metal-oxide-semiconductor field-effect transistors (NMOSFET) transistors, p-type metal-oxide-semiconductor field-effect transistors (PMOSFET), and/or a combination of NMOSFET and PMOSFET transistors. In an exemplary embodiment, NMOSFET may be used in place of the transistors 1102 through 1108. The transistors 1102 through 1108 are coupled to either the positive component of the first reference frequency 252(+) or the negative component of the first reference frequency 252(−). For example, the transistor 1102 connects to the negative component of the first reference frequency 252(−). The positive component of the first reference frequency 252(+) and/or the negative component of the first reference frequency 252(−) activates and/or deactivates the transistors 1102 through 1108 to mix or multiply the differential representation of the first gain measurement signal 852 by the differential representation of the differential representation of the first reference frequency 252.

For example, when the positive component of the first reference frequency 252(+) corresponds to a maximum value, current passes through the transistors 1106 and 1108 to a positive component the second gain measurement signal 854 (+). The negative component of the first reference frequency 252(−) corresponds to a minimum value causing current not to flow through transistors 1102 and 1104 to the negative component of the second gain measurement signal 854(−). Likewise, when the negative component of the first reference frequency 252(−) corresponds to a maximum value, current passes through the transistors 1102 and 1104 to the negative component of the second gain measurement signal 854(−). The positive component of the first reference frequency 252 (+) corresponds to a minimum value causing current not to flow through transistors 1106 and 1108 to the positive component of the second gain measurement signal 854(+).

Figure 12:
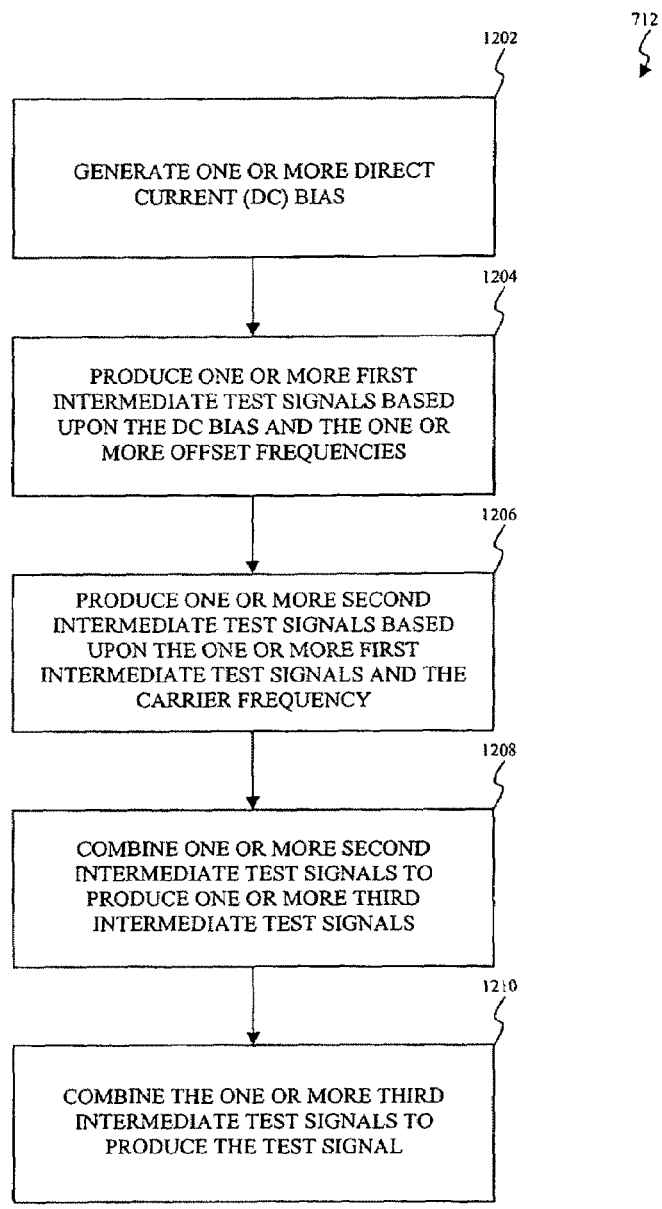
FIG. 12 is a flowchart of exemplary operational steps of to produce a DPM gain measurement signal according to an exemplary embodiment of the present invention.

FIG. 12 is a flowchart of exemplary operational steps of to produce a DPM gain measurement signal according to an exemplary embodiment of the present invention. More specifically, FIG. 12 further defines step 712 of FIG. 7. The invention is not limited to this operational description. Rather, it will be apparent to persons skilled in the relevant art(s) from the teachings herein that other operational control flows are within the scope and spirit of the present invention. The following discussion describes the steps in FIG. 12.

At step 1202, accurate process and temperature independent one or more direct current (DC) biases, such as the DC biases 850.1 through 850.$n$ to provide an example, are produced. The one or more DC biases may have a substantially similar and/or different magnitude from other corresponding DC biases. In an exemplary embodiment, the one or more DC biases may include either one or more DC currents and/or one or more DC voltages. In another exemplary embodiment, the one or more DC biases may be derived from a bandgap voltage reference in a Set-top Device, such as either the Set-top Device 200 or the Set-top Device 400. In an additional, exemplary embodiment, the one or more DC biases may include a first DC bias, a second DC bias, and a third DC bias. In a further exemplary embodiment, the first DC bias may be implemented using a current source with a magnitude of i, the second DC bias may be implemented using a current source with a magnitude of $\sqrt{2}*i$, and the third DC bias may be implemented using a current source with a magnitude of i.

At step 1204, one or more first intermediate test signals, such as the first gain measurement signals 852.1 through 852.6 to provide an example, based upon a corresponding DC bias from the one or more DC biases of step 1202 and a corresponding offset frequency from the one or more offset frequencies of step 710 are produced. A first gain measurement signal generator, such as the first gain measurement signal generators 802.1 through 802.6, produces the one or more first intermediate test signals by mixing or multiplying the corresponding DC bias and the corresponding offset frequency. In an exemplary embodiment, the first gain measurement signal generator may switch one or more transistors of a quad-circuit, such as the quad circuits 1002.1 through 1002.3 to provide some examples, to modulate the corresponding DC bias by the corresponding offset frequency.

At step 1206, one or more second intermediate test signals based upon a corresponding first intermediate test signal from the one or more first intermediate test signals of step 1204 and a corresponding carrier frequency from one or more carrier frequencies are produced. A second gain measurement signal generator, such as the second gain measurement signal generators 804.1 through 804.6, produces the one or more second intermediate test signals by mixing or multiplying the corresponding first intermediate test signal and the corresponding carrier frequency. The second gain measurement signal generator may switch one or more transistors to modulate the corresponding first intermediate test signal by the corresponding carrier frequency.

At step 1208, the one or more second intermediate test signals of step 1206 are combined to produce one or more third intermediate test signals. A harmonic rejection module, such as the harmonic rejection module 806.1 and/or the harmonic rejection module 806.2 to provide some examples, substantially reduces harmonic content from the one or more second intermediate test signals of step 1206 to produce the one or more third intermediate test signals.

At step 1210, the one or more third intermediate test signals of step 1208 are combined to produce the test signal. An image rejection module, such as the image rejection module 808 to provide an example, substantially reduces image content from the one or more third intermediate test signals of step 1208 to produce the test signal.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A Set-top Device for determining a desired channel input power at the Set-top Device based on a downstream communication signal having an unknown power level, comprising:
    a signal generator configured to produce a measurement signal having a known power level;
    a summing network configured to combine the measurement signal and the downstream communication signal to produce an embedded communication signal;
    a mixer configured to downconvert the embedded communication signal to produce a desired communication channel, wherein the desired communication channel includes a representation of the measurement signal and a representation of the downstream communication signal; and
    a post-processor module configured to measure a power level of the representation of the measurement signal and a power level of the representation of the downstream communication signal and to determine the desired channel input power based on the power level of the representation of the measurement signal and the power level of the representation of the downstream communication signal.

2. The Set-top Device of claim 1, further comprising:
    a clock generator configured to produce a reference frequency,
    wherein the signal generator is further configured to produce the measurement signal based on the reference frequency, and
    wherein the mixer is further configured to downconvert the embedded communication signal using the reference frequency to produce the desired communication channel.

3. The Set-top Device of claim 2, wherein the clock generator comprises:
    a first oscillator configured to produce a first reference frequency; and
    a second oscillator configured to produce a second reference frequency.

4. The Set-top Device of claim 1, wherein the signal generator further comprises:
    a reference divider configured to divide down a reference frequency to produce an offset frequency; and
    a test-signal generator configured to produce the measurement signal based on the reference frequency and the offset frequency.

5. The Set-top Device of claim 4, wherein the reference divider comprises:
    a counter module configured to divide the reference frequency by a variable divide ratio to produce a first divided reference frequency; and
    a first divider circuit configured to divide the first divided reference frequency by a first divisor to produce a second divided reference frequency; and
    a second divider circuit configured to divide the second divided reference frequency by a second divisor to produce the offset frequency.

6. The Set-top Device of claim 4, wherein the test-signal generator comprises:
   a first test-signal generator configured to produce a first intermediate test signal based on the reference frequency and the offset frequency;
   a second test-signal generator configured to produce a second intermediate test signal based on the reference frequency and the offset frequency, wherein the first intermediate test signal and the second intermediate test signal are substantially offset in phase; and
   an image rejection module configured to combine the first intermediate test signal and the second intermediate test signal to produce the measurement signal.

7. The Set-top Device of claim 1, further comprising:
   a channel selection filter configured to filter the desired communication channel to produce a filtered desired communication channel.

8. The Set-top Device of claim 7, further comprising:
   a variable gain amplifier configured to amplify the filtered desired communication channel to produce an amplified communication channel.

9. The Set-top Device of claim 8, further comprising:
   an analog to digital converter (ADC) configured to convert the amplified communication channel from an analog representation to a digital representation to produce a digitized communication channel, wherein the post-processor is further configured to measure the power level of the representation of the measurement signal and the power level of the representation of the downstream communication signal embedded within the digitized communication channel.

10. The Set-top Device of claim 1, wherein the post-processor module determines the desired channel input power by combining the power level of the representation of the measurement signal and the power level of the representation of the downstream communication signal.

11. The Set-top Device of claim 1, wherein the downstream communication signal includes at least one of a group consisting of:
   a National Television Standards Committee (NTSC) cable television (CATV) broadcast signal;
   a digital cable television (DCATV) broadcast signal; and
   an Advanced Television Systems Committee (ATSC) digital cable television (DCATV) broadcast signal.

12. The Set-top Device of claim 1, wherein the post-processor module is further configured to determine a gain of the Set-top Device by comparing the power level of the representation of the measurement signal and the known power level of the measurement signal and to determine the desired channel input power by comparing the gain of the Set-top Device and the power level of the representation of the downstream communication signal.

13. The Set-top Device of claim 12, wherein the post-processor module determines the gain of the Set-top Device by subtracting the known power level of the measurement signal and the power level of the representation of the measurement signal.

14. The Set-top Device of claim 12, wherein the post-processor module determines the desired channel input power by subtracting the gain of the Set-top Device and the power level of the representation of the downstream communication signal.

15. The Set-top Device of claim 1, wherein the desired channel input power represents an actual received power of a communication signal transmitted by a Cable Modem Termination System (CMTS).

16. A method for determining a desired channel input power at the Set-top Device based on a downstream communication signal having an unknown power level, comprising:
   (a) producing a measurement signal having a known power level;
   (b) combining the measurement signal and the downstream communication signal to produce an embedded communication signal;
   (c) downconverting the embedded communication signal to produce a desired communication channel, wherein the desired communication channel includes a representation of the measurement signal and a representation of the downstream communication signal;
   (d) measuring a power level of the representation of the measurement signal and a power level of the representation of the downstream communication signal; and
   (e) determining the desired channel input power based on the power level of the representation of the measurement signal and the power level of the representation of the downstream communication signal.

17. The method of claim 16, further comprising:
   (f) generating a first reference frequency and a second reference frequency,
   wherein step (a) comprises:
      (a)(i) producing the measurement signal having the known power level based on the first reference and the second reference frequency, and
   wherein step (c) comprises:
      (c)(i) downconverting the embedded communication signal using the second reference frequency to produce the desired communication channel.

18. The method of claim 17, wherein step (f) comprises:
   (f)(i) generating the first reference frequency using a first oscillator; and
   (f)(ii) generating the second reference frequency using a second oscillator.

19. The method of claim 16, wherein step (a) comprises:
   (a)(i) dividing down a reference frequency to produce an offset frequency; and
   (a)(ii) producing the measurement signal by mixing the reference frequency and the offset frequency.

20. The method of claim 19, wherein step (a)(i) comprises:
   (a)(i)(A) dividing down the reference frequency by a variable divide ratio to produce a first divided reference frequency; and
   (a)(i)(B) dividing down the first divided reference frequency by a first divisor to produce a second divided reference frequency; and
   (a)(i)(C) dividing down the second divided reference frequencies by a second divisor to produce the offset frequency.

21. The method of claim 19, wherein step (a)(ii) comprises:
   (a)(ii)(A) producing a first intermediate test signal based on the reference frequency and the offset frequency;
   (a)(ii)(B) producing a second intermediate test signal based on the reference frequency and the offset frequency; and
   (a)(ii)(C) combining the first intermediate test signal and the second intermediate test signal to produce the measurement signal.

22. The method of claim 16, further comprising:
   (f) filtering the desired communication channel to produce a filtered desired communication channel.

23. The method of claim 22, further comprising:
   (g) amplifying the filtered desired communication channel to produce an amplified communication channel.

24. The method of claim 23, further comprising:

(h) converting the amplified communication channel from an analog representation to a digital representation to produce a digitized communication channel.

25. The method of claim 16, wherein the downstream communication signal includes at least one of:

a National Television Standards Committee (NTSC) cable television (CATV) broadcast signal;

a digital cable television (DCATV) broadcast signal; and an Advanced Television Systems Committee (ATSC) digital cable television (DCATV) broadcast signal.

26. The method of claim 16, wherein step (e) comprises:

(e)(i) determining the desired channel input power by combining the power level of the representation of the measurement signal and the power level of the representation of the downstream communication signal.

27. The method of claim 16, wherein step (e) comprises:

(e)(i) determining a gain of the Set-top Device by comparing the power level of the representation of the measurement signal and the known power level of the measurement signal; and (e)(ii) determining the desired channel input power by comparing the gain of the Set-top Device and the power level of the representation of the downstream communication signal.

28. The method of claim 27, wherein step (e)(i) comprises:

(e)(i)(A) determining the gain of the Set-top Device by subtracting the known power level of the measurement signal and the power level of the representation of the measurement signal.

29. The method of claim 27, wherein step (e)(ii) comprises:

(e)(ii)(A) determining the desired channel input power by subtracting the gain of the Set-top Device and the power level of the representation of the downstream communication signal.

30. The method claim 16, wherein the desired channel input power represents an actual received power of a communication signal transmitted by a Cable Modem Termination System (CMTS).

31. A Set-top Device for determining a desired channel input power of a downstream communication signal having an unknown power level, comprising:

a signal generator configured to produce a measurement signal having a known power level;

a summing network configured to combine the measurement signal and the downstream communication signal to produce an embedded communication signal;

a mixer configured to downconvert the embedded communication signal to produce a desired communication channel, wherein the desired communication channel includes a first component indicative of the downstream communication signal and a second component indicative of the measurement signal; and a post-processor module configured to measure a power level of the first component and a power level of the second component, to determine a gain of the Set-top Device by comparing the second component and the known power level of the measurement signal, and to determine the desired channel input power by comparing the gain of the Set-top Device and the first component.

* * * * *